(12) United States Patent
McCulley et al.

(10) Patent No.: US 12,126,507 B2
(45) Date of Patent: *Oct. 22, 2024

(54) IN-LINE PERFORMANCE MONITORING

(71) Applicant: 128 Technology, Inc., Burlington, MA (US)

(72) Inventors: Scott A. McCulley, Burlington, MA (US); Abilash Menon, Boxborough, MA (US); Anna Yungelson, Lexington, MA (US)

(73) Assignee: 128 TECHNOLOGY, INC., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,106

(22) Filed: Apr. 10, 2023

(65) Prior Publication Data

US 2023/0246930 A1 Aug. 3, 2023

Related U.S. Application Data

(63) Continuation of application No. 17/365,007, filed on Jul. 1, 2021, now Pat. No. 11,750,483, which is a
(Continued)

(51) Int. Cl.
*H04L 43/04* (2022.01)
*H04L 43/00* (2022.01)
(Continued)

(52) U.S. Cl.
CPC .......... *H04L 43/04* (2013.01); *H04L 43/0829* (2013.01); *H04L 43/0864* (2013.01); *H04L 43/087* (2013.01); *H04L 43/14* (2013.01)

(58) Field of Classification Search
CPC . H04L 43/0852; H04L 43/0829; H04L 43/04; H04L 43/087; H04L 43/12;
(Continued)

(56) References Cited

U.S. PATENT DOCUMENTS 6,363,056 B1 3/2002 Beigi et al.
6,868,094 B1 3/2005 Bordonaro et al.
(Continued)

FOREIGN PATENT DOCUMENTS

CN 1492630 A 4/2004
CN 102404166 A 4/2012
(Continued)

OTHER PUBLICATIONS

"Cisco Dynamic Multipoint VPN: Simple and Secure Branch-to-Branch Communications Data Sheet," Cisco Systems, Inc., Retrieved from: https://www.cisco.com/c/en/us/products/collateral/security/dynamic-multipoint-vpn-dmvpn/data_sheet_c78-468520.html, Jul. 25, 2017, 7 pp.
(Continued)

*Primary Examiner* — Elton Williams
(74) *Attorney, Agent, or Firm* — Shumaker & Sieffert, P.A.

(57) ABSTRACT

One function of a communications network, or of nodes in such a network, is to gather data that is useful in assessing network performance, and quantifying metrics of node and/or network performance. Various embodiments disclosed herein improve the ability of nodes and networks to gather such data, and quantify metrics of node and/or network performance by selectively marking existing network traffic, and in preferred embodiments without having to dilute network traffic by generating and transmitting dummy data packets.

20 Claims, 13 Drawing Sheets

Related U.S. Application Data continuation of application No. 16/501,857, filed on Jun. 19, 2019, now Pat. No. 11,075,824.

(51) Int. Cl.
*H04L 43/0829* (2022.01)
*H04L 43/0864* (2022.01)
*H04L 43/087* (2022.01)

(58) Field of Classification Search
CPC . H04L 43/16; H04L 43/0858; H04L 43/0864; H04L 43/0835; H04L 43/0841; H04L 45/22; H04J 3/0682
See application file for complete search history.

(56) References Cited

U.S. PATENT DOCUMENTS

| | | | |
|---|---|---|---|
| 8,499,095 B1 | 7/2013 | Sullenberger et al. | |
| 8,706,883 B2 | 4/2014 | Aggarwal et al. | |
| 8,737,198 B1 | 5/2014 | Holness et al. | |
| 9,729,439 B2 | 8/2017 | MeLampy et al. | |
| 9,929,949 B2 | 3/2018 | Mahadevan et al. | |
| 9,998,565 B2 | 6/2018 | Gupta et al. | |
| 10,027,567 B2 | 7/2018 | Cociglio | |
| 10,027,768 B2 | 7/2018 | Rao | |
| 10,142,126 B2 | 11/2018 | Venugopal et al. | |
| 10,200,264 B2 | 2/2019 | Menon et al. | |
| 10,341,140 B2 | 7/2019 | Shen et al. | |
| 10,355,989 B1 | 7/2019 | Panchal et al. | |
| 10,841,206 B2 | 11/2020 | Menon et al. | |
| 11,075,824 B2 * | 7/2021 | McCulley | H04L 43/04 |
| 11,223,538 B1 | 1/2022 | Arumugam et al. | |
| 11,252,126 B1 | 2/2022 | Thunga et al. | |
| 11,429,463 B2 | 8/2022 | Graham | |
| 11,438,255 B2 | 9/2022 | Tillotson et al. | |
| 11,972,134 B2 | 4/2024 | Irwin et al. | |
| 11,973,686 B1 | 4/2024 | Panchal et al. | |
| 2004/0052259 A1 * | 3/2004 | Garcia | H04L 43/00 370/392 |
| 2004/0264434 A1 | 12/2004 | Weissberger et al. | |
| 2005/0025069 A1 | 2/2005 | Aysan | |
| 2005/0058081 A1 | 3/2005 | Elliott | |
| 2006/0239204 A1 | 10/2006 | Boronaro et al. | |
| 2009/0097417 A1 | 4/2009 | Asati et al. | |
| 2014/0226514 A1 | 8/2014 | Zhou | |
| 2014/0369351 A1 * | 12/2014 | Singh | H04L 12/18 370/390 |
| 2016/0134502 A1 * | 5/2016 | Edwards | H04L 43/04 370/252 |
| 2016/0337193 A1 | 11/2016 | Rao | |
| 2016/0337223 A1 | 11/2016 | Mackay | |
| 2016/0373341 A1 | 12/2016 | Venugopal et al. | |
| 2017/0026417 A1 | 1/2017 | Ermagan et al. | |
| 2017/0078410 A1 | 3/2017 | Rao | |
| 2017/0346722 A1 | 11/2017 | Smith et al. | |
| 2018/0367445 A1 | 12/2018 | Bajaj | |
| 2019/0260657 A1 * | 8/2019 | Filsfils | H04L 41/5009 |
| 2019/0312914 A1 | 10/2019 | Cohn | |
| 2020/0252234 A1 | 8/2020 | Ramamoorthi et al. | |
| 2020/0366598 A1 | 11/2020 | Kaplan et al. | |
| 2021/0036953 A1 | 2/2021 | Menon et al. | |
| 2021/0328889 A1 | 10/2021 | McCulley et al. | |
| 2022/0006756 A1 | 1/2022 | Ramaswamy et al. | |
| 2022/0078046 A1 | 3/2022 | Wang et al. | |
| 2022/0086062 A1 | 3/2022 | Gutierrez Estevez | |
| 2022/0103471 A1 | 3/2022 | Kulkarni et al. | |
| 2022/0294725 A1 | 9/2022 | Vasseur et al. | |
| 2022/0311695 A1 | 9/2022 | Kaciulis et al. | |
| 2022/0329563 A1 | 10/2022 | Yeh et al. | |
| 2023/0034314 A1 | 2/2023 | Brissette et al. | |
| 2023/0059537 A1 | 2/2023 | Gavand et al. | |
| 2023/0246930 A1 | 8/2023 | McCulley et al. | |
| 2024/0064099 A1 | 2/2024 | Pang et al. | |

FOREIGN PATENT DOCUMENTS

| | | |
|---|---|---|
| CN | 105830393 A | 8/2016 |
| CN | 106209413 A | 12/2016 |
| CN | 107810619 A | 3/2018 |
| EP | 1401147 A1 | 3/2004 |
| EP | 3690649 A1 | 8/2020 |
| WO | 2015090364 A1 | 6/2015 |

OTHER PUBLICATIONS

Anonymous, "Cisco SD-WAN Dynamic on-demand Tunnel Feature—The Network DNA", Aug. 31, 2021, 4 pp., Retrieved from the Internet: URL:https://www.thenetworkdna.com/2021/08/cisco-sd-wan-dynamic-on-demand-tunnel.html.

Cisco, "Dynamic On-Demand Tunnels", Aug. 20, 2020, 10 pp., Retrieved from the Internet: URL:https://www.cisco.com/c/en/us/td/docs/routers/sdwan/configuration/system-interface/ios-xe-17/systems-interfaces-book-xe-sdwan/m-dynamic-on-demand-tunnels.pdf.

Guha et al., "NAT Behavioral Requirements for TCP," Network Working Group, RFC 5382, Oct. 2008, 21 pp.

International Preliminary Report on Patentability from International Application No. PCT/US2020/035753, dated Dec. 30, 2021, 13 pp.

International Search Report and Written Opinion for International Application No. PCT/US2020/035753, mailed Aug. 25, 2020, 21 pp.

Keranen et al., "Interactive Connectivity Establishment (ICE): A Protocol for Network Address Translator (NAT) Traversal," IETF, RFC 8445, Jul. 2018, 100 pp.

Prosecution History from U.S. Appl. No. 16/501,857, dated Aug. 29, 2019 through Jun. 30, 2021, 143 pp.

Prosecution History from U.S. Appl. No. 17/365,007, dated Nov. 16, 2021 through Jan. 11, 2023, 26 pp.

U.S. Appl. No. 17/449,311, filed Sep. 9, 2021, naming inventors Scholz et al.

Fioccola et al., "Alternate-Marking Method for Passive and Hybrid Performance Monitoring," Internet Engineering Task Force (IETF), RFC 8321, Jan. 2018, 33 pp.

Fioccola et al., "Alternate-Marking Method," Internet Engineering Task Force (IETF), RFC 9341, Dec. 2022, 22 pp.

Notice of Allowance from U.S. Appl. No. 17/365,007 dated Apr. 19, 2023, 7 pp.

Extended Search Report from counterpart European Application No. 20827685.7 dated Jun. 6, 2023, 10 pp.

Notice of Allowance from U.S. Appl. No. 17/365,007 dated Jul. 28, 2023, 2 pp.

First Office Action and Search Report, and translation thereof, from counterpart Chinese Application No. 202080044231.6 dated Jan. 22, 2024, 11 pp.

Response to Extended Search Report dated Jun. 6, 2023, from counterpart European Application No. 20827685.7 filed Dec. 19, 2023, 83 pp.

Second Office Action, and translation thereof, from counterpart Chinese Application No. 202080044231.6 dated Jul. 25, 2024, 34 pp.

* cited by examiner

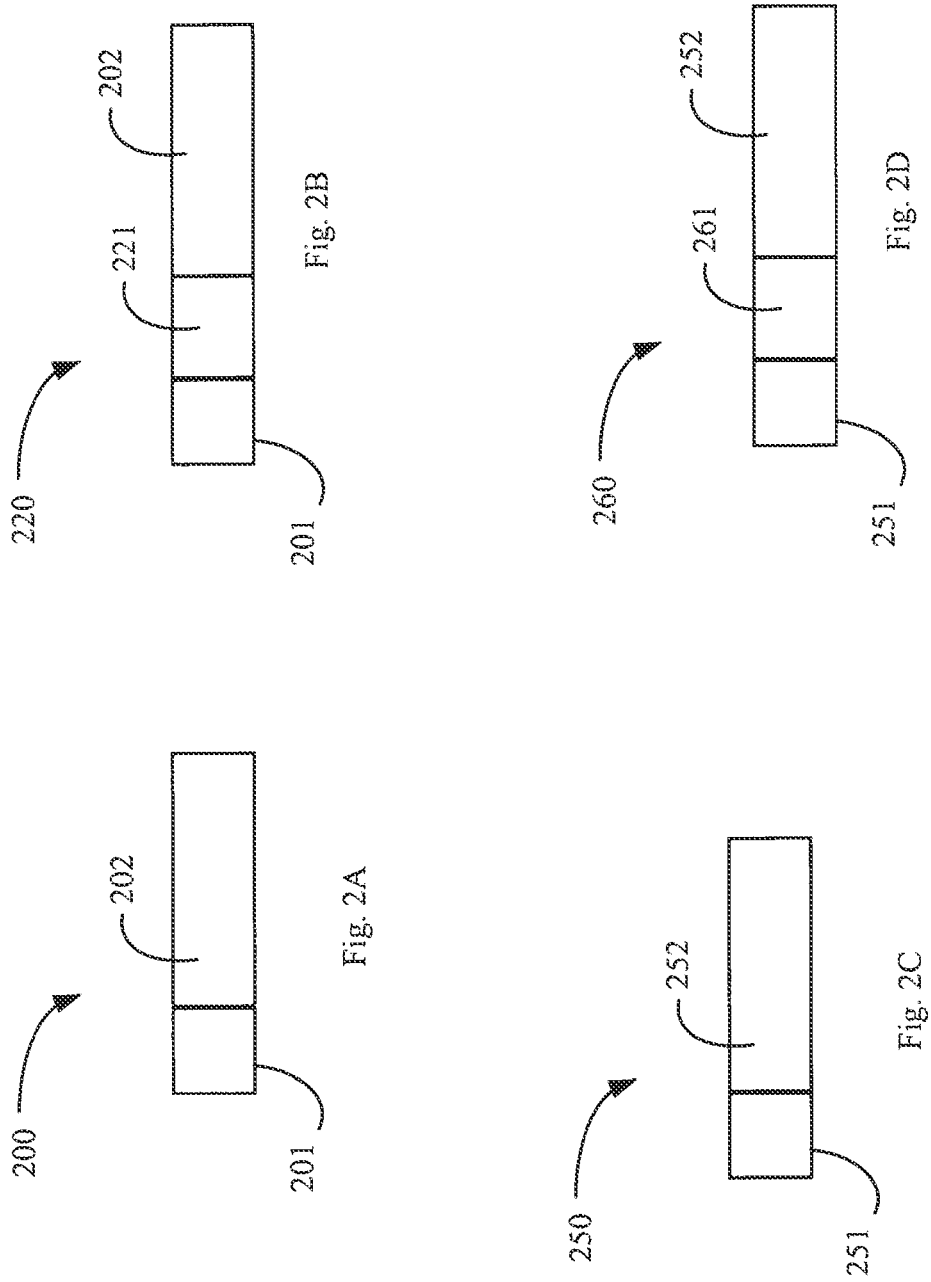

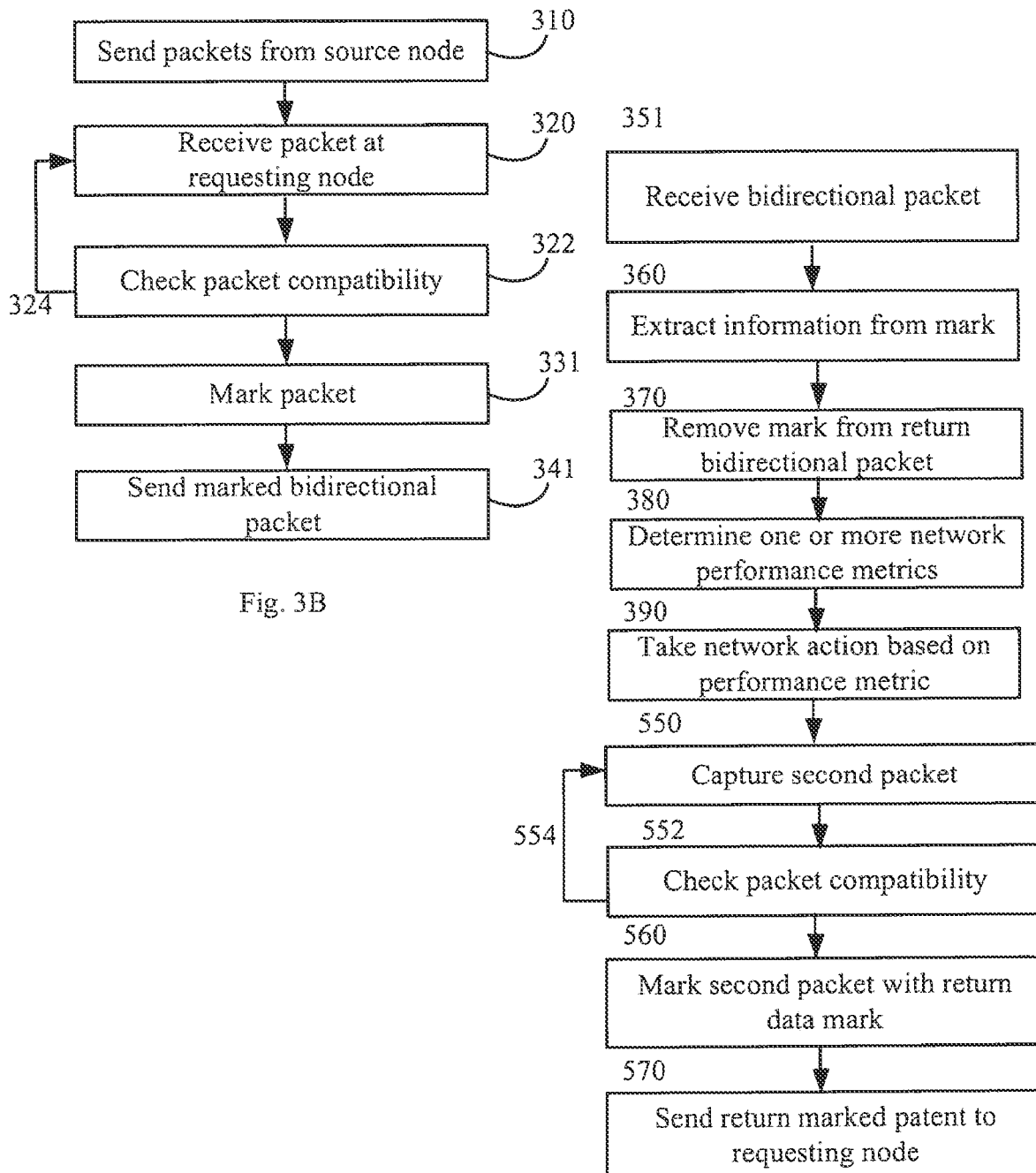

```
 /*
  *   0                   1                   2                   3
  *   0 1 2 3 4 5 6 7 8 9 0 1 2 3 4 5 6 7 8 9 0 1 2 3 4 5 6 7 8 9 0 1
  *  +-+-+-+-+-+-+-+-+-+-+-+-+-+-+-+-+-+-+-+-+-+-+-+-+-+-+-+-+-+-+-+-+
  *  |Tx Co|                    Transmit Timestamp                  |
  *  +-+-+-+-+-+-+-+-+-+-+-+-+-+-+-+-+-+-+-+-+-+-+-+-+-+-+-+-+-+-+-+-+
  *  |Rx Co|                    Received Timestamp                  |
  *  +-+-+-+-+-+-+-+-+-+-+-+-+-+-+-+-+-+-+-+-+-+-+-+-+-+-+-+-+-+-+-+-+
  *  |D|             Previous RX Color Count                        |
  *  +-+-+-+-+-+-+-+-+-+-+-+-+-+-+-+-+-+-+-+-+-+-+-+-+-+-+-+-+-+-+-+-+
  */
```

```
 /*                   1                   2                   3
  *   0 1 2 3 4 5 6 7 8 9 0 1 2 3 4 5 6 7 8 9 0 1 2 3 4 5 6 7 8 9 0 1
  *  +-+-+-+-+-+-+-+-+-+-+-+-+-+-+-+-+-+-+-+-+-+-+-+-+-+-+-+-+-+-+-+-+
  *  |                        Transmit Timestamp                     |
  *  +-+-+-+-+-+-+-+-+-+-+-+-+-+-+-+-+-+-+-+-+-+-+-+-+-+-+-+-+-+-+-+-+
```

```
 /*                      1                   2                   3
  *  0 1 2 3 4 5 6 7 8 9 0 1 2 3 4 5 6 7 8 9 0 1 2 3 4 5 6 7 8 9 0 1
  * +-+-+-+-+-+-+-+-+-+-+-+-+-+-+-+-+-+-+-+-+-+-+-+-+-+-+-+-+-+-+-+-+
  *                         Received Timestamp                        ~424
  * +-+-+-+-+-+-+-+-+-+-+-+-+-+-+-+-+-+-+-+-+-+-+-+-+-+-+-+-+-+-+-+-+
```

```
 /*                      1                   2                   3
  *  0 1 2 3 4 5 6 7 8 9 0 1 2 3 4 5 6 7 8 9 0 1 2 3 4 5 6 7 8 9 0 1
  * +-+-+-+-+-+-+-+-+-+-+-+-+-+-+-+-+-+-+-+-+-+-+-+-+-+-+-+-+-+-+-+-+
  * | Rx Col |                                                        ~423
  * +-+-+-+-+-+-+-+-+-+-+-+-+-+-+-+-+-+-+-+-+-+-+-+-+-+-+-+-+-+-+-+-+
```

Fig. 4F

IN-LINE PERFORMANCE MONITORING

This application is a continuation of U.S. application Ser. No. 17/365,007, filed Jul. 1, 2021, which is a continuation of U.S. patent application Ser. No. 16/501,857, filed Jun. 19, 2019, the entire content of which is herein incorporated by reference.

TECHNICAL FIELD

The present disclosure relates to network communications and, more particularly, to monitoring network performance.

BACKGROUND

One function of some networks is to gather information about network performance and to determine, from that information, metrics describing that network performance. Known methods interrupt the flow of network traffic to transmit, across all or a portion of the network, dedicated packets that are not part of normal network traffic, but for which network performance can be monitored. Employing such dedicated packets has a significant drawback, however, in that sending a dedicated packet uses resources that might otherwise have been used to send real data packets from normal network traffic.

SUMMARY

In accordance with an illustrative embodiment, a method monitors performance of transmission of data over a network of nodes, which network includes at least a requesting node and a responding node.

The method includes capturing, at the requesting node, a first packet traveling downstream from a previous node. The first packet conforms to a first communication protocol. Various embodiments involve any of several approaches to capturing a first packet. For example, in one embodiment, capturing a first packet includes capturing a candidate packet arriving at the requesting node, and confirming that the candidate packet is configured in a protocol that can be safely modified.

In another embodiment, capturing a first packet includes capturing a candidate packet arriving at the requesting node, and confirming that the candidate packet is of a size that is below a threshold size.

In another embodiment, capturing a first packet includes capturing a set of candidate packets, checking each of the candidate packets for compliance with a pre-defined criterion, and then selecting, as the first packet, one of the candidate packets that meets the pre-defined criterion.

The method then marks the first packet by adding a request mark to create a first downstream marked packet. The request mark includes signature data. After marking, the method transmits the first downstream marked packet to the responding node according to normal operation of the network. In response, the responding node creates an upstream marked packet, and transmits the upstream marked packet to the requesting mode. The upstream marked packet conforms to a second communication protocol and has a response mark having response data.

Subsequently, the requesting node receives that upstream marked packet sent by the responding node in response to the first downstream marked packet. The requesting node extracts the response data from the upstream marked packet, and removes the response mark from the upstream marked packet. The method then determines, from the response data, a performance metric for communication between the requesting node and the responding node.

In some embodiments, the network includes an intermediate node between the requesting node and the responding node, and the performance metric is round-trip latency between the requesting node and the responding node via the intermediate node. In such an embodiment, the response data includes a modified time of transmission of the first downstream marked packet from the requesting node, the modified time of transmission comprising the sum of (i) the time of transmission of the first downstream marked packet from the requesting node and (ii) turnaround time, the turnaround time being the time between receipt of the first downstream marked packet at the responding node and the transmission of the upstream marked packet from the responding node).

In some embodiments, the performance metric is round-trip latency between the requesting node and the responding node, and determining the round-trip latency, at the requesting node, includes recording a time of receipt of the upstream marked packet at the requesting node; and subtracting, from the time of receipt of the upstream marked packet at the requesting node, the modified time of transmission of the first downstream marked packet from the requesting node.

In some embodiments, the performance metric is jitter. In such embodiments, determining jitter includes capturing, at the requesting node, a second packet traveling downstream. The method marks the second packet by adding a second request mark to create a second downstream marked packet in which the second request mark includes a time of transmission of the second downstream marked packet from the requesting node to the responding node; and transmits the second downstream marked packet to the responding node according to normal operation of the network. In such embodiments, the response mark of the upstream marked packet sent by the responding node includes jitter data including a difference between apparent transit times, respectively, of the first downstream marked packet and the second downstream marked packet from the requesting node to the responding node.

In some embodiments, the performance metric is packet loss, and the signature data of the first downstream packet includes a color. Such methods include sending a set of additional downstream marked request packets from the requesting node to the responding node, each of the additional downstream marked request packets marked with the same color; and the response data from the upstream marked packet includes data reporting the number packets of the color received at the responding node.

After determining one or more performance metrics, some embodiments take one or more network actions. Taking network action in response to one or more determined performance metrics includes one of (a) changing the priority level of future packets traveling to the requesting node, or (b) specifying a modified route of future packets, such that the future packets avoid the requesting node.

Another embodiment is directed to a method of detecting packet loss rate over a network of nodes, the network including a requesting node and a responding node. The method includes capturing, at the requesting node, a plurality of packets traveling downstream, each packet of the plurality of packets conforming to a communication protocol. The method then creates a plurality of downstream marked packets by, for each captured packet: marking the packet by adding a color mark to create a downstream marked packet, the color mark including color data associating the downstream marked packet with a color; transmitting the downstream marked packets to the responding node according to normal operation of the network; tracking the number of downstream marked packets of each color transmitted to the downstream mode. Subsequently, the method includes receiving, at the requesting node, an upstream marked packet sent by the responding node, the upstream marked packet having mark carrying response data reporting the number of packets of each color received at the responding node; extracting the response data from the upstream marked packet; removing the mark from the upstream marked packet; and determining, the number of packets of a given color lost between the requesting node and the responding node by subtracting the data reporting the number of packets of the given color received at the responding node from the number of downstream marked packets of each color transmitted by the requesting node to the responding node.

In some embodiments, capturing a plurality of packets traveling downstream includes, for each packet capturing a candidate packet arriving at the requesting node, and then includes one of the following steps: (a) confirming that the candidate packet is configured in a protocol that can be safely modified, or (b) confirming that the candidate packet is of a size that is below a threshold size.

Some embodiments also include taking network action in response to determining the number of packets of a given color lost between the requesting node and the responding node. Taking network action may include, for example, specifying a modified route of future packets, such that the future packets avoid the requesting node.

Some embodiments include a computer program product for use on a requesting node in a network of nodes. The computer program product includes a tangible, non-transient computer-usable medium having computer readable program code thereon. That computer-readable program code, when executed at the requesting node, causes the requesting node to perform a computer process according to any of the foregoing methods.

Another embodiment is directed to a requesting network node. The node includes a network interface configured to couple to a communication network, and a computing processor communicatively coupled to the network interface. The computing processor is configured to: capture a first packet traveling downstream from a previous node, the first packet conforming to a first communication protocol; mark the first packet by adding a first mark to create a first downstream marked packet, the first mark including signature data; transmit the first downstream marked packet to a responding node according to normal operation of the communication network; receive, at the requesting network node from the responding node, an upstream marked packet in response to the downstream marked packet, the upstream marked packet conforming to a second communication protocol and having response data; extract the response data from the upstream marked packet; remove the response data from the upstream marked packet; and determine, from the response data, a performance metric for communication between the requesting node and the responding node.

BRIEF DESCRIPTION OF THE DRAWINGS

The foregoing features of embodiments will be more readily understood by reference to the following detailed description, taken with reference to the accompanying drawings, in which:

FIG. 2A schematically illustrates an embodiment of a packet traveling from a source node to a destination node through a requesting node;

FIG. 2B schematically illustrates an embodiment of a marked request packet;

FIG. 2C schematically illustrates an embodiment of a packet traveling over the network through a responding node;

FIG. 2D schematically illustrates an embodiment of a marked response packet;

FIG. 3B is a flow chart illustrating an embodiment of the operation of a node as both requesting node and responding node;

FIG. 3C is a flow chart illustrating processing a bidirectional packet;

FIG. 4C schematically illustrates an embodiment of a mark;

FIG. 4D schematically illustrates an embodiment of a mark;

FIG. 4E schematically illustrates an embodiment of a mark;

FIG. 4F schematically illustrates an embodiment of a mark;

DETAILED DESCRIPTION

Illustrative embodiments improve the operation of data networks by enabling enhanced monitoring of data flow and node performance.

One function of a communications network, or of nodes in such a network, is to gather data that is useful in assessing network performance, and quantifying metrics of node and/or network performance. Various embodiments disclosed herein improve the ability of nodes and networks to gather such data, and quantify metrics of node and/or network performance by selectively marking existing network traffic, and in preferred embodiments without having to dilute network traffic by generating and transmitting dummy data packets.

Definitions. As used in this description and the accompanying claims, the following terms shall have the meanings indicated, unless the context otherwise requires.

A "set" includes at least one member.

The term "response data" means data added to a packet by a responding node for sending to a requesting node.

The term "signature data" means data added to a packet by a requesting node for sending to a responding node.

The term "marking node" means a node configured to mark a packet. In illustrative embodiments described below, requesting node 130 and responding node 150 are each examples of a marking node.

Figure 1A:
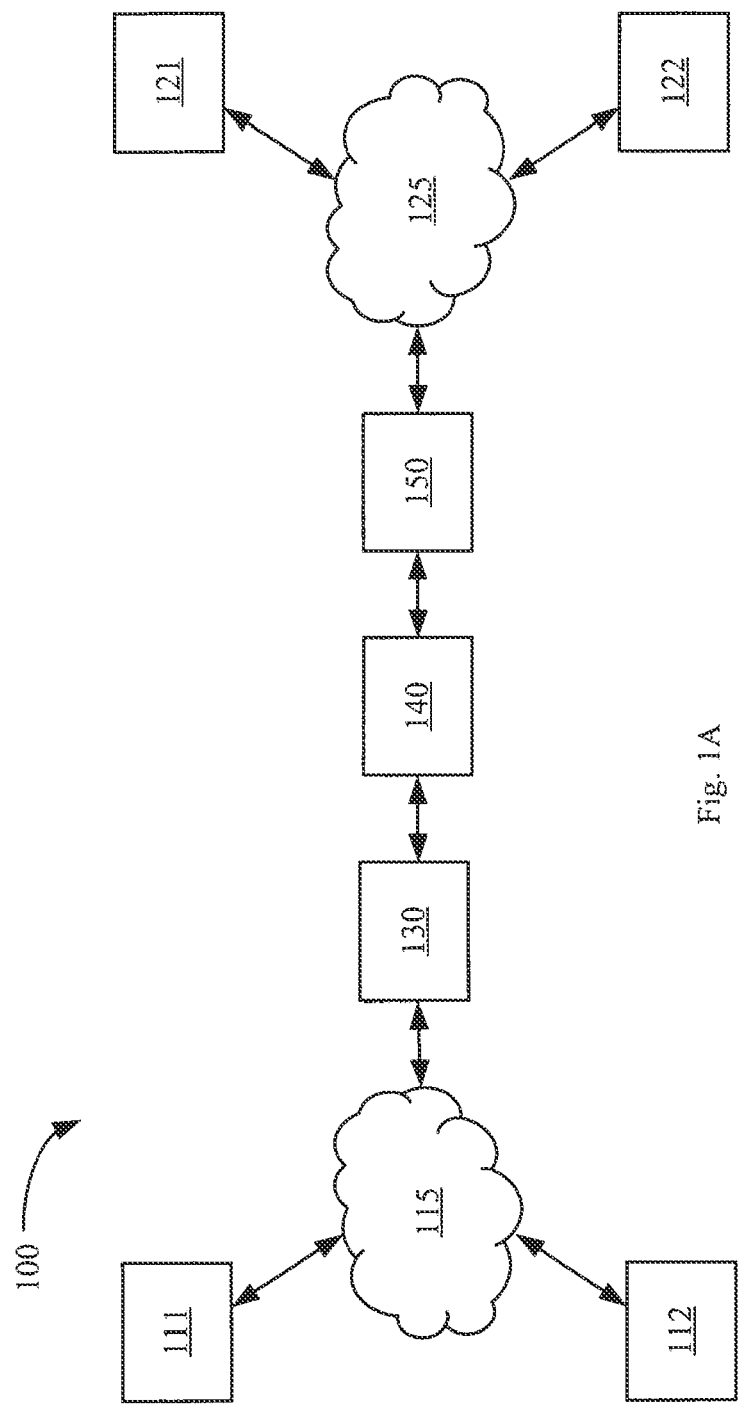
FIG. 1A schematically illustrates an embodiment of a network having a plurality of nodes.

FIG. 1A schematically illustrates an embodiment of a network 100 according to an illustrative embodiment. The network 100 is configured to allow data packets to flow among its nodes. A node may be, for example, a router or a switch. Some of the nodes are configured to implement methods of gathering data to assess network performance, as described in the embodiments below.

In normal operation of the network, data in packets may flow from any node in the network 100 (a "source" node) to any other node in the network 100 (a "destination" node) via one or more of the other nodes in the network 100. For example, node 111 may form a frame of packets and transmit those packets individually to node 121, which node 121 reassembles the individual packets into the frame. For example, packets may travel through the network 100 by natural routing, in which each node visited by a packet determines the next node in the packet's path, or by stateful routing, as described below.

For purposes of illustration, consider a frame of packets traveling from node 111 (the source node in this example) to node 121 (the destination node in this example) via node 130, node 140 and node 150.

A party, such as a network operator or the party sending the data from source node 111, may desire to monitor the transmission to determine whether the network 100 is providing the level of service for which the party contracted. For example, the party may desire to determine one or more network performance metrics, such as latency of packet transmission between node 130 and 150, jitter of transmission between node 130 and node 150, and/or packet loss between node 130 and node 150.

To that end, node 130 and node 150 are configured to mark one or more packets, which packets are already traversing the network 100, to configure those one or more packets in a way that enables one or more of nodes 130 and 150 to assess the path between them, which includes one or more intermediate nodes 140.

Figure 1B:
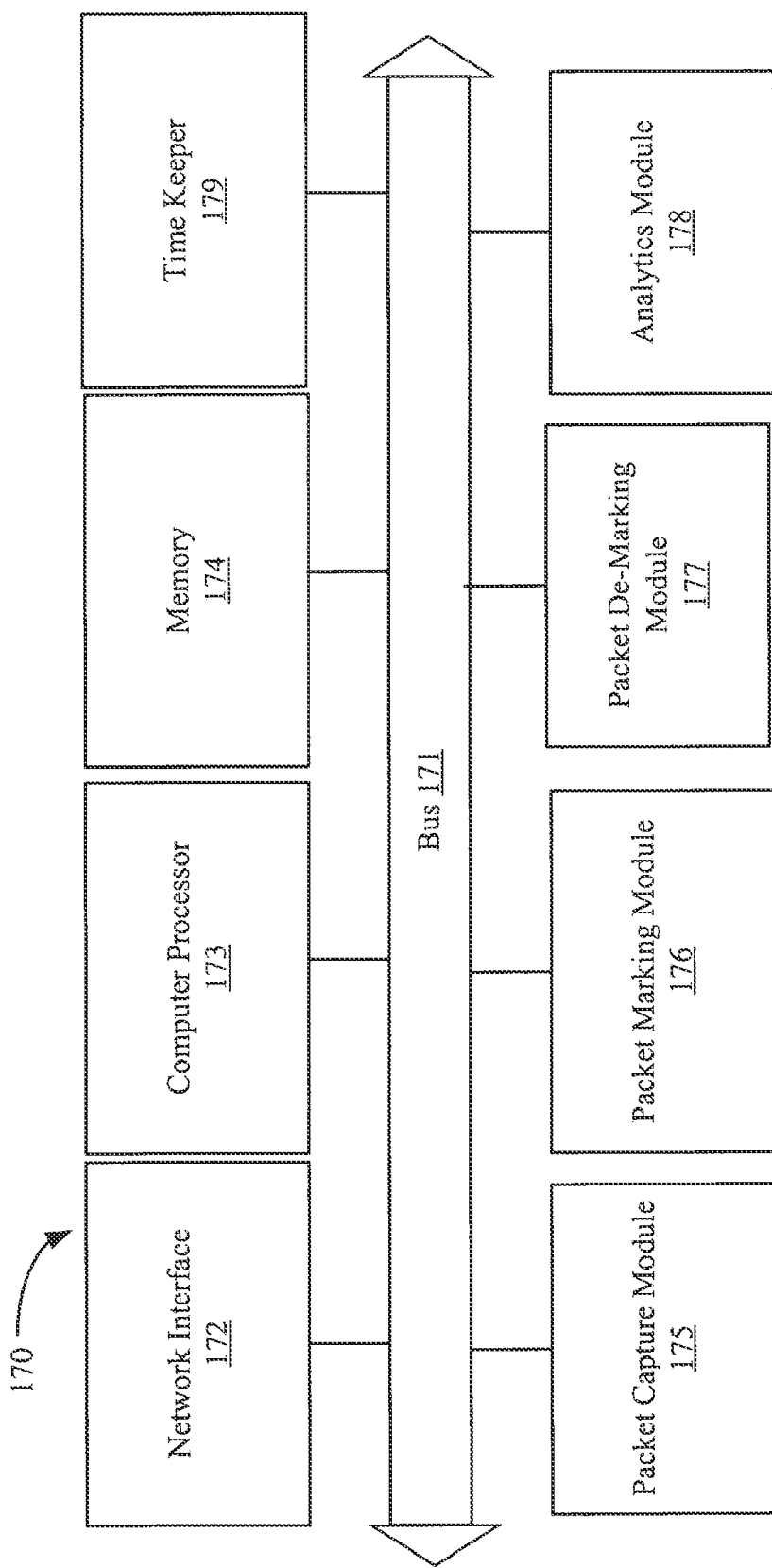
FIG. 1B schematically illustrates an embodiment of a node.

FIG. 1B schematically illustrates an embodiment of a node 170. In general, any of the nodes of the network 100 in FIG. 1A may have an architecture according to node 170 in FIG. 1B. Generally, a node 170 may be a router or a switch. Node 170 includes several modules in communication with one another over communications bus 171.

In some embodiments, one or more or all of the modules may be implemented as preprogrammed hardware elements (e.g., application specific integrated circuits, FPGAs). In other embodiments, one or more or all of the modules may be implemented one a computing processor 173, such as a microprocessor as known in the semiconductor industry. For example, in some embodiments the memory module 174 may store instructions which, when executed on the computer processor 173, implement the functionalities described herein. As another example, in some embodiments the memory module 174 may store data, such transmission times of a marked request packet 220; receipt time of response marked packet 260, the number of colored packets transmitted in a given color block, the number of color packets received in a given color block, and/or other signature data or response data to be transmitted in a marked packet (220; 260). In some embodiments, the memory module may be configured as a database, for example to store data used in stateful routing as described below.

The node 170 includes a network interface 172 configured to communicatively couple to a network 100. In addition, the node 170 includes a packet capture module 175 configured to capture, from packets flowing on the network 100, a packet to be marked and used as described herein, for example as by a requesting node, or as by a responding node. The node 170 also includes a packet marking module 176 configured to mark a captured packet in the ways described herein. The node 170 also includes a packet de-marking module 177 configured to remove a mark from a marked packet, to restore the captured packet that was modified to create the marked packet, as described below. The node 170 also includes an analytics module 178 configured to extract data from a received marked packet, and analyze such data.

Time keeper module 179 keeps track of the time at the node. It should be noted that in most embodiments, each node keeps track of its own time (which may be referred-to as "node-local" time), and that nodes do not have times synchronized with one another, or time having a common reference. A time keeper module 179 may track its node-local time as the number of milliseconds passed since the node was activated, or since the time the node was rebooted, or since the time keeper module 179 was re-set (e.g., to zero), to name but a few examples.

Figure 3A:
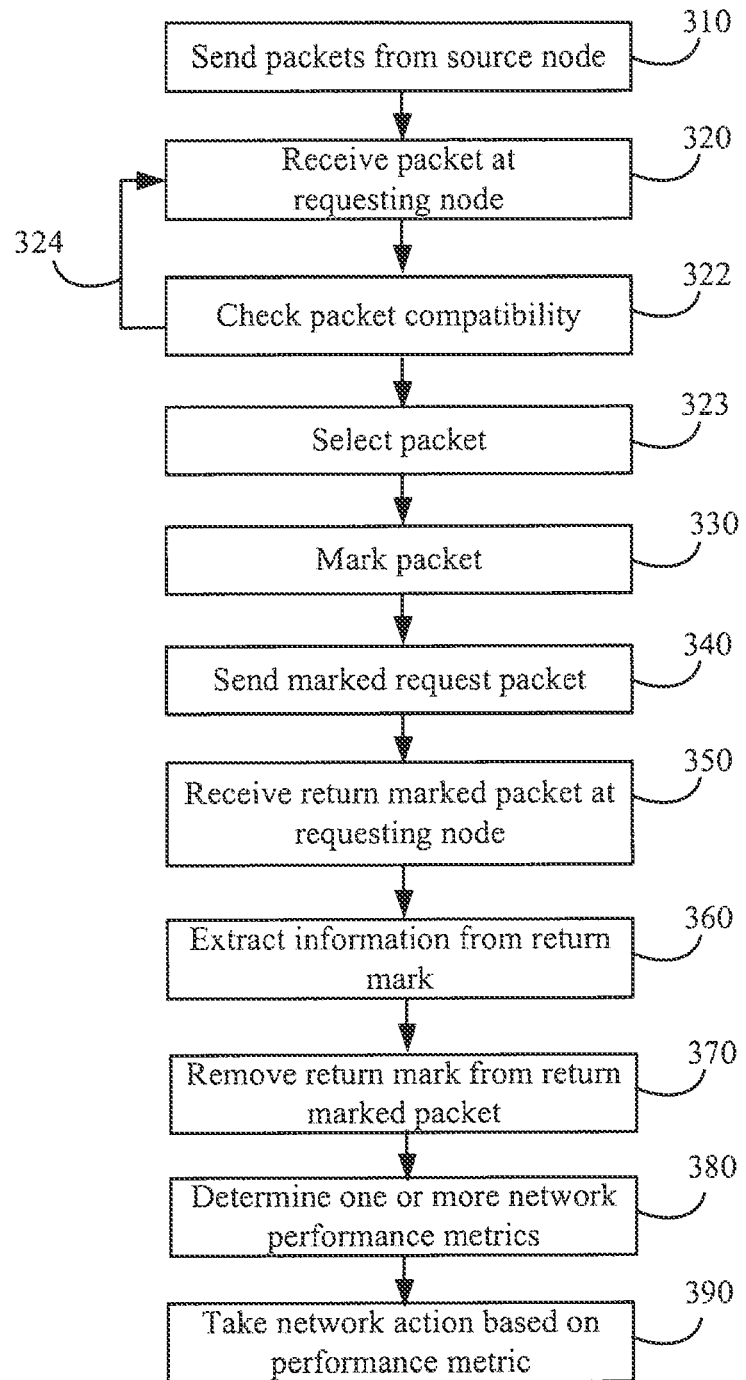
FIG. 3A is a flow chart illustrating an embodiment of the operation of a requesting node.

FIG. 3A is a flowchart that illustrates an embodiment of a process, using node 111 as the source node and node 121 as the destination node. Packets 200 sent by source node 111 at step 310 travel through network nodes 115 to node 130, which may be referred to as the requesting node or "forwarding" node. An embodiment of a generic packet 200 is schematically illustrated in FIG. 2A, and includes a payload 202 and one or more header fields 201. Packet 200 represents any of a variety of packet structures known in the art according to various protocols.

Selecting a Packet for Marking

Requesting node 130 receives the packets at step 320.

Each such arriving packet may be referred to as a "candidate" packet, and may be selected as the first selected packet 200 by any of a variety of ways. For example, at step 322, illustrative embodiments evaluate a candidate packet according to one or more criteria to determine whether the candidate packet can be safely modified, and whether the candidate packet is otherwise compatible with the function for such first selected packet 200 is being selected. For example, some protocols define packet structure in a way that, if the structure of a packet were marked as described herein, the packet would be unable to traverse the network 100 according to the normal operation of the network 100, or would have its payload data corrupted.

If a candidate packet can be safely modified and meets other desired criteria, as described below, the candidate packet may be selected as the first selected packet 200, and otherwise the candidate packet is not selected, and is simply sent on its way through the network, and at step 324 the process loops back to step 320 and awaits the next packet.

As explained below, the first selected packet 200 is, after being marked, transmitted just as it would have been if it were not selected and marked. In other words, the first selected packet 200, even when used in the ways described below, is still capable of traveling through the network 100 and performing its intended purpose of delivering its payload to the destination node 121. Use of the first selected packet 200 does not impair the ordinary operation of the packet 200 or the network 100, as such operations would be understood by a person of ordinary skill in the art for a packet not marked as described herein.

One such criterion is that the candidate packet is destined for, or can be routed to, the responding node 150. If so, the candidate packet is available to be selected as the first selected packet 200, and otherwise the candidate packet is not selected, and is simply sent on its way through the network.

Another possible criterion for step 322 is whether the candidate packet corresponds with a protocol that can be modified without damaging the packet (i.e. the candidate packet can be safely modified).

Protocol, Path, Priority

Some embodiments are configured to determine metrics for packets having specified protocol, and/or packets that are traveling via a specific path, and/or have a specified priority.

To that end, another possible criterion for step 322 is whether the candidate packet corresponds with a specified protocol. Such embodiments may evaluate a candidate packet to assess whether the candidate packet conforms to the specified protocol. If so, the candidate packet is available to be selected as the first selected packet 200, and otherwise the candidate packet is not selected, and is simply sent on its way through the network.

For embodiments configured to determine metrics for packets traveling a specified path, or between a given source node and a given destination node, another possible criterion for step 322 is whether the candidate packet is destined to travel that specified path. If so, the candidate packet is available to be selected as the first selected packet 200, and otherwise the candidate packet is not selected, and is simply sent on its way through the network.

For embodiments configured to determine metrics for packets having a specified priority level, another possible criterion for step 322 is whether the candidate packet has the specified priority level. Such embodiments evaluate a candidate packet to assess whether the candidate packet has the specified priority level. If so, the candidate packet is available to be selected as the first selected packet 200, and otherwise the candidate packet is not selected, and is simply sent on its way through the network.

Some protocols, some networks, or some nodes, limit the size of a packet. Moreover, some such protocols, networks or nodes will, when identifying a packet that exceeds a size limit, break that packet into two or more smaller packets, and replace the packet with those smaller packets. If a marked packet (e.g., 220; 260) were broken up on this way, it may not be capable of serving the functions described above. To avoid that problem, some embodiments check the size of a candidate packet at step 322, to determine whether the candidate packet, when marked at step 330, below, would have a size that exceeds a size limit (i.e., a maximum allowable size). If it is determined that the size of the first packet would exceed a size limit, then the candidate packet is not marked, and is instead transmitted toward the destination node 121 without being marked, and the method at step 324 loops back to step 320. The method loops in this way until the requesting node 330 receives a packet 200 that, when marked at step 330, will not exceed the size limit.

It should be noted that the criteria for step 322 may include any of the criteria discussed above, and embodiments may include two or more criteria in any combination. Without limiting the options for such embodiments, it should be noted that the criteria for step 322 may include protocol and path; protocol and priority level; path and priority level; and protocol, path and priority level.

At step 323, the method selects a packet from the candidate packets. It should be noted that the packet selected and marked is a packet of data traveling between the source node 111 and the destination node 121 according to the normal operation of the network 100. The first packet 200 conforms to a first communication protocol.

In preferred embodiments, only a subset of available packets meeting the specified criteria description are selected, because selecting every such packet would quickly reach a point of diminishing value. Rather, preferred embodiments select packets according to an elapsed time (e.g., one packet every N seconds), or according to a number of passing packets (e.g., one packet out of every M packets, or every Mth packet, where M is an integer).

Marking a Packet

Returning to FIG. 3, at step 330, the requesting node 130 marks the selected packet 200 with a request mark 221 to create a marked request packet 220 (which may be referred-to as a "downstream" marked packet). The request mark 221, which may be a header or part of a header for example, includes information described below. It should be noted that the marked request packet 220 includes all the headers and the payload (and any other content) of the selected packet 200, all unchanged by the marking process, along with the newly added request mark 221.

Figures 4A, 4B:
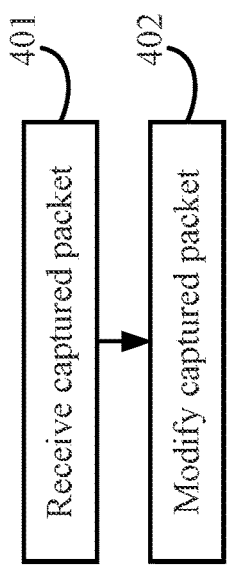
FIG. 4A is a flow chart illustrating an embodiment of a method of marking a packet.
FIG. 4B schematically illustrates an embodiment of a mark.

Illustrative embodiments mark a selected packet (e.g., 200; 250) by adding to the selected packet a new data field (e.g., a "mark"). FIG. 4A is a flow chart illustrating an embodiment of a method of marking a packet. It should be noted that the method of FIG. 4A may be used to mark a first packet 200 to form a request packet 220, and may also be used to mark a second packet 250 to produce a response packet 260.

In illustrative embodiments, the new data field is not a modification of a field already in the selected packet (e.g., header 201; 251, or a payload 202; 252). Modifying an existing field of the selected packet introduces an undesirable element of risk. For example, if a requesting node 130 or responding node 150 can modify an existing field of the selected packet, then other nodes (e.g., intermediate node 140) likely can also modify that field. If that were possible, then the data in the request mark 220 received by the responding node 150, and the data in the response mark 260 received by the requesting node 130, would not be reliable. Moreover, modifying a header might interfere with the desired transmission of the selected packet so that the packet would be unable to reach its destination node, and modifying the payload may irreversibly damage the packet so that its data is faulty.

Rather, a marking node adds marking data in a new data field (a mark 221; 261) in a way that does not interfere with or damage the selected packet's existing header 201 or payload 202.

Illustrative embodiments add a mark (e.g., 221; 261) having a Type-Length-Value ("TLV") format. As known in the art, an intermediate node (e.g., node 140) may, in processing a packet, safely skip the TLV-formatted data (in this case, the mark), and still parse the rest of the packet. Preferred embodiments place the mark in an un-encrypted portion of the packet, to help reduce the byte overhead added to the packet.

An illustrative embodiment of a value 420 of a TLV-formatted mark is schematically illustrated in FIG. 4B. The content of the value 420 is, in general, determined by the data necessary to perform the desired function (e.g., to quantify latency, or jitter, or packet loss). The embodiment of FIG. 4B includes the following fields. The transmit color field (421), typically 4 bits, and identifies the color of the packet.

The transmit time stamp field (422) records the current timestamp in node-local time (e.g., of the requesting node 130, or of the responding node 150) at the time of marking. The transmit time stamp field (422) in this example has a length of 28 bits.

In some embodiments, the received color field (423) identifies the color of a received packet. The received color field (423) in this example has a length of 4 bits. In other embodiments, the received color field (423) includes data indicating the number of packets of a given color were received at a responding node 150.

The adjusted timestamp field (424) records a cached timestamp, in milliseconds, from an adjacent node adjusted by the elapsed time between caching of the value and the current time. The adjusted timestamp field (424) in this example has a length of 28 bits.

The drop bit field (425) indicates whether the packet should be dropped. The drop bit field (425) in this example is a single bit.

The previous color received count field (426) record the number of packets receive from the previous color block. The count is in reference to the color previous to the current received color in field 423. The previous color received count field (426) in this example has a length of 15 bits.

The previous received color field (427) is associated with the previous color received count field (426).

The current transmit color field (428) record the current color of the packet being marked.

FIG. 4C schematically illustrates an embodiment of a mark that includes only a transmit timestamp 422 indicating when the packet was transmitted by a requesting node (e.g., which may be referred to as "Ttreq"). Such a mark may be created and sent, for example, by a requesting node 130 for use in quantifying latency or jitter.

FIG. 4D schematically illustrates an embodiment of a mark that includes only a transmit color 421. Such a mark may be created and sent, for example, by a requesting node 130 for use in quantifying packet loss.

FIG. 4E schematically illustrates an embodiment of a mark that includes only a received timestamp 424 indicating when a request packet 220 was received at a responding node 150 (e.g., which may be referred to as "Trreq"). Such a mark may be created and sent, for example, by a responding node 150 for use in quantifying latency or jitter.

FIG. 4F schematically illustrates an embodiment of a mark that includes only a received color field 423. The received color field 423 in this embodiment may indicate the number of packets of a given color received at a responding node 150 from a requesting node 130. Such a mark may be created and sent, for example, by a responding node 150 for use in the process of quantifying packet loss.

Transmitting a Marked Request Packet

After marking, at step 340 the requesting node 130 sends the marked request packet 220 towards to the destination node 121 via intermediate node 140. Intermediate node 140 forwards the marked packet 220 to responding node 150. It should be noted that the intermediate node 140 treats the marked packet 220 just as it would handle the selected packet 200 if the selected packet 200 had not been transformed into the marked packet 220.

Receiving a Response Packet

Returning to FIG. 3, at step 350, the requesting node 130 receives, from the responding node 150 in response to the marked request packet 220, a response marked packet 260 (which may be referred-to as an "upstream" marked packet), as schematically illustrated in FIG. 2C. As described below, the response marked packet 260 is created by the responding node 150 from a second packet 250 traveling from another source node (e.g., 121, 122) to requesting node 130. The second packet may be on its way through the network via nodes 150 and 130 to node 211 or 212 for example. The second packet may be, but is not required to be, part of the same communication session as packet 200. The second packet conforms to a second communication protocol, which second communication protocol may be that same or, or different from, the first communication protocol.

The response marked packet 260 includes a response data mark 261 that includes response data inserted by the responding node 150.

The requesting node 130 extracts the response data from the response data mark 261 at step 360, and at step 370 removes the response data mark 261 from the response marked packet 260 to recreate the second packet 250 and, in preferred embodiments, sends that second packet 250 on its way through the network 100 towards its destination node. In preferred embodiments, after the requesting node 130 removes the response data mark 261 from the response marked packet 260, the packet is identical to the packet 250 captured at step 550 described below.

It should be noted that some embodiments create and send a dummy response, as discussed further below, rather than creating a response marked packet 260 from a captured packet.

Determining Network Performance Metrics

At step 380, the requesting node processes the response data to determine one or more of the network performance metrics, such as latency (the round-trip transit time for packets traveling round trip between a requesting node and a responding node), jitter, and packet loss.

Figure 6:
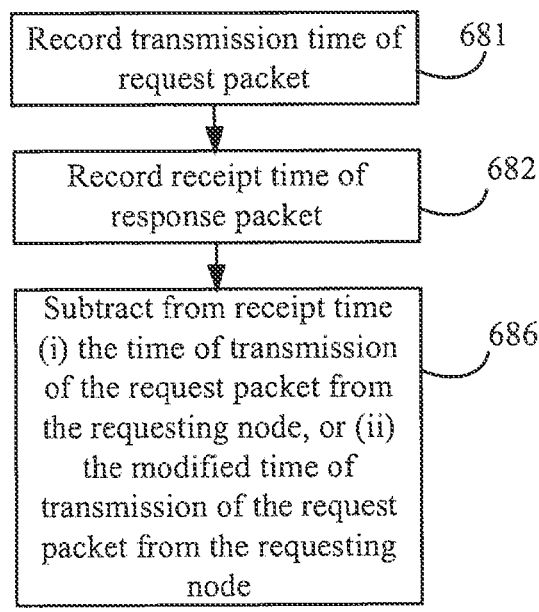
FIG. 6 is a flow chart illustrating an embodiment of a method of determining latency.
Figure 7A:
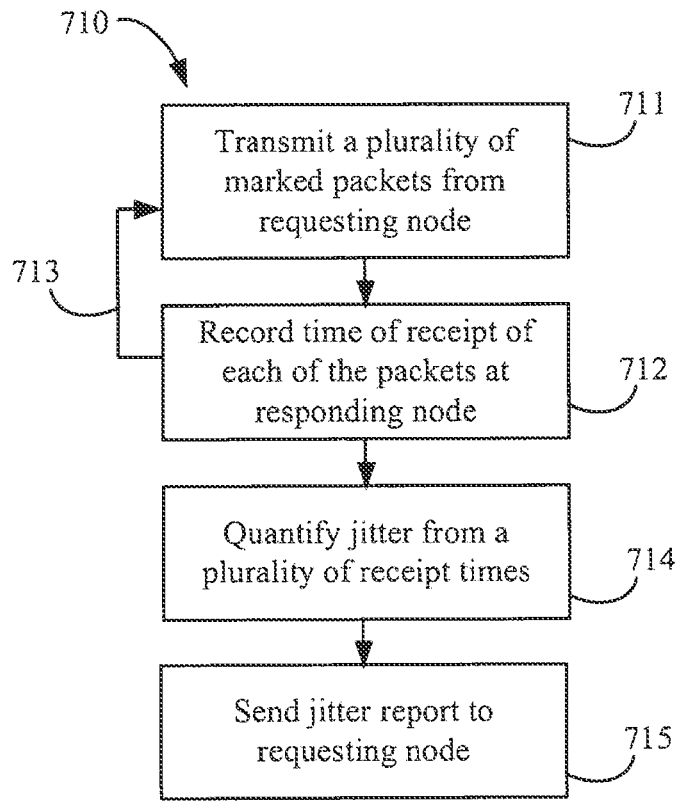
FIG. 7A is a flow chart of an embodiment of a method of quantifying jitter.
Figure 7B:
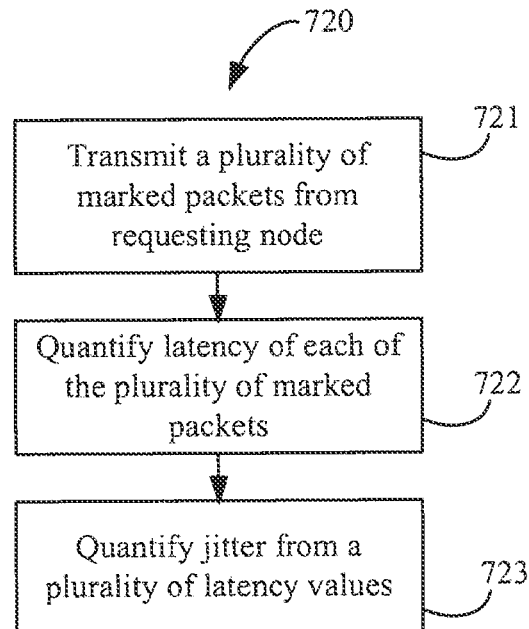
FIG. 7B is a flow chart of another embodiment of a method of quantifying jitter.
Figure 8:
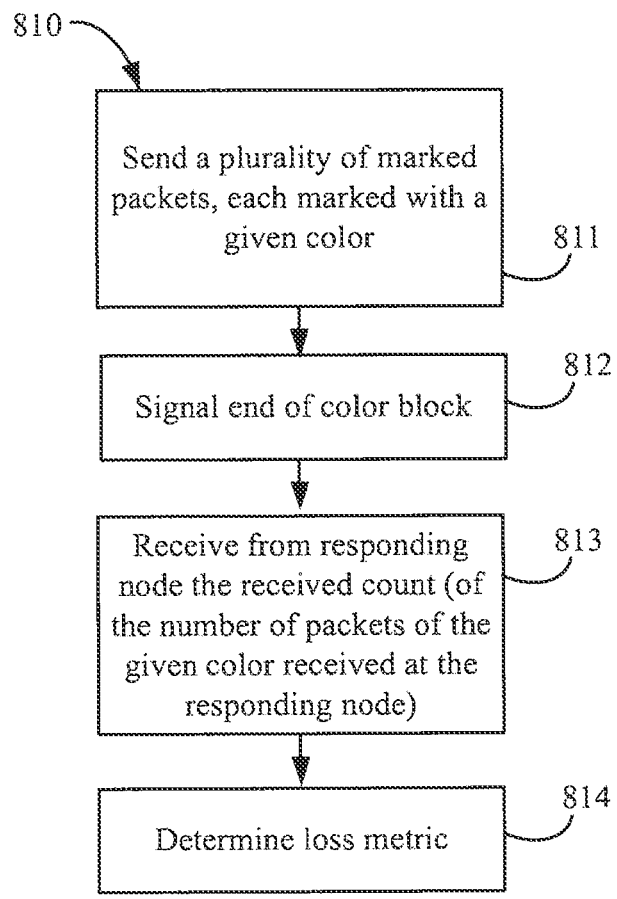
FIG. 8 is a flow chart of an embodiment of a method of quantifying packet loss.

To that end, FIG. 6 is a flow chart illustrating an embodiment of a method of determining round trip latency, and FIG. 7A and FIG. 7B are flow chart illustrating embodiments of a method of determining jitter, and FIG. 8 is a flow chart illustrating an embodiment of a method of determining packet loss.

Some embodiments also take network action based on one or more of the determined performance metrics. For example, at step 390, some embodiments specify a modified route for future packets, which modified route avoids the requesting node and/or the responding node. Some embodiments of step 390 change the priority level of future packets, for example in response to the determined latency and/or jitter.

Operation of a Responding Node

Figure 5:
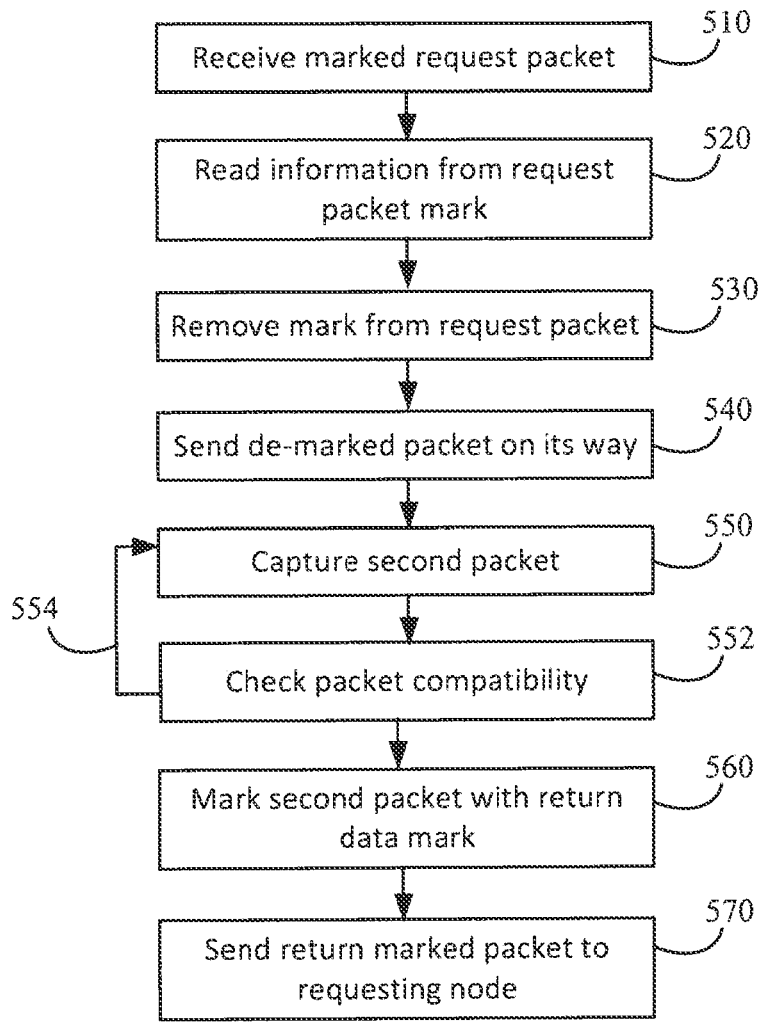
FIG. 5 is a flow chart illustrating an embodiment of the operation of a responding node.

FIG. 5 is a flowchart that illustrates steps taken by the responding node 150, for example in-between steps 340 and 350 of FIG. 3, above.

At step 510, the responding node 150 receives the marked request packet 220 from intermediate node 140.

At step 520, the responding node 150 extracts the signature data from the request mark 221.

The responding node 150 also removes the request mark 221 from the marked request packet 220 at step 530, to reconstitute or recreate the original packet 200, and then at step 540 the responding node 150 sends the recreated original packet 200 to the destination node 221. In preferred embodiments, after the responding node 150 removes the data mark 221 from the request packet 220, the packet is identical to the packet 200 captured at step 320.

At step 550, the responding node 150 captures a second packet 250 traveling towards requesting node 130. For example, the second packet have originated at node 122 (its source node) and be travelling to node 112 (its destination node). The second packet 250, illustrated in FIG. 2C, includes a header 251 and a payload 252.

Some embodiments check the size of the second packet 250 at step 552, to determine whether the second packet 250, when marked at step 560, below, would have a size that exceeds a maximum allowable size. If it is determined that the size of the second packet 250 would exceed a size limit, then the second packet 250 is not marked, and is instead transmitted without being marked, and the method at step 554 loops back to step 550. The method loops in this way until the responding node 150 receives a packet 250 that, when marked at step 560, will not exceed the size limit.

At step 560 the responding node 150 marks the second packet 250 with a response data mark 261 to create the response marked packet 260. The response data mark 261 includes data used in calculating one or more performance metrics. For example, if a response marked packet 260 is to be used in quantifying latency, the response data mark 261 includes at least a time of transmission, from the requesting node 130, of the marked request packet 220 to which the responding node 150 is responding, or a modified time of transmission as described herein. As another example, if a response marked packet 260 is to be used in quantifying jitter, the response data mark 261 includes a jitter report as described herein. As yet another example, if a response marked packet 260 is to be used in quantifying packet loss, the response data mark 261 includes at least the number of marked request packets 220 of that color were received at the responding node 150.

As explained below, the response marked packet 260, after being marked, is transmitted just as it would have been if it were not selected and marked. In other words, the response packet 260, even when used in the ways described below, is still capable of traveling through the network 100 and performing its intended purpose of delivering its payload to the destination node 112. Use of the second selected packet 250 as described herein does not impair that packet's operation.

Then, at step 570, the responding node 150 sends the response marked packet 260 to the requesting node 130. The response marked packet 260 includes all the headers and the payload (and any other content) of the second packet 250, along with the response data mark 251.

Dummy Response

Some embodiments create a dummy response marked packet 260 rather than capture and mark a second packet 250 as described above for steps 550 and 560. For example, a responding node 150 might be configured to do so when there is little or no packet traffic arriving at responding node 150 from which responding node 150 could create a response marked packet 260. In such cases, the responding node 150 may mark the drop bit field 425, and in response to receiving such a dummy packet, the requesting node 130 will drop the dummy packet, rather than send that packet on through the network 100 after removing the response mark 261 at step 370. In some embodiments, a dummy response marked packet 260 has a mark 261, but does not carry a payload 252.

Bidirectional Packets

Although embodiments are described above in terms of a request packet 220 and a response packet 260, each of which may be thought of as being unidirectional, some embodiments create, transmit, and analyze bidirectional packets. A bidirectional packet is a packet that simultaneously acts as both a request packet (e.g., 220) and a response packet (260).

To that end, a bidirectional packet includes a mark (a "bidirectional" mark) that includes information of both a request mark 211 and a response mark 261.

For example, a node 130 may need to send a request to node 150, and simultaneously send a response to a preceding request received at node 130 from node 150. In such a case, node 130 acts as both requesting node and receiving node, and may be referred-to simply as the "sending" node.

To that end, node 130 may create and transmit a bidirectional packet, according to steps 310, 320, 322, 324, and 331 of the flow chart in FIG. 3B. Steps 310, 320 and 322 and 324 are the same as those steps in FIG. 3A. Step 331 creates a bidirectional mark in the selected packet. FIG. 4A schematically illustrates an embodiment of a bidirectional mark.

At step 341, the sending node 130 transmits the bidirectional packet to the node 150, which may be referred-to in this embodiment as the "receiving" node. At step 351 (FIG. 3C), the receiving node 150 receives the bidirectional packet.

The receiving node 150 processes the bidirectional packet (FIG. 3C) both as if it is a requesting packet (i.e., as described above in connection with steps 360, 370, 380 and 390) and also as if it were a response packet (550, 552, 560 and 570).

Latency

Turning to FIG. 6, a method of determining round-trip latency between requesting node 130 and responding node 150 begins at step 681 by sending a marked request packet 220 from the requesting node 130 to the responding node 150 (e.g., via one or more intermediate nodes 140). In this example, the mark 221 includes a time value 422 recording the time (Ttreq) at which the requesting node 130 transmits the request packet. That time is the node-local time at the requesting node 130.

At step 682, the requesting node 130 receives a response packet 260 packet from the responding node 150, and records the node-local time of such receipt (Trreq). In an illustrative embodiment, the response packet 260 includes the time value (Ttreq) as transmitted in the request packet 220, and the requesting node 130 extracts that time value (Ttreq) from the response packet 260. Because these two times are both represented in terms of the node-local time of the requesting node 130, the requesting node 130 is able to calculate, and does calculate, the round-trip latency as the present node-local time at which the response packet 260 packet was received by the requesting node 130 (Trreq) minus the time that the request packet was sent (i.e., latency=Trreq−Ttreq).

An alternative embodiment provides a more accurate determination of the round trip latency between the requesting node 130 and the responding node 150 by accounting for the turn-around time at the responding node 150. For example, although the time between the responding node's receipt of the request packet 220, and the responding node's transmission of the response packet 260 (the turn-around time) is typically very short, it could be so long as to undesirably distort the round-trip latency. One such alternative embodiment addresses that risk by modifying the time value (Ttreq) received in the request packet 220 (i.e., the time that the request packet 220 was transmitted by the requesting node) by adding to that time value the amount of time between the responding node's receipt of the request packet 220, and the responding node's transmission of the response packet 260 (the turn-around time), to produce a modified request time (Ttreqmod), and sending that modified time value in the response mark 261 of the response packet 260. Then, calculation of the round-trip latency at the requesting node 130 extracts that modified time value (Ttreqmod) from the response packet 260 and calculates the round-trip latency as the present node-local time at which the response packet 260 was received by the requesting node 130 (Trreq) minus the modified time value (i.e., latency=Trreq−Ttreqmod).

Jitter

FIG. 7A is a flow chart of an embodiment of a method 710 of quantifying jitter.

At step 711, the method sends a marked request packet 220 from the requesting node 130 to the responding node 150. The signature data of the marked request packet 220 includes the transmission time (Ttreq) 422 at which the marked packet was transmitted from the requesting node 130. In some embodiments, the transmission time may be specified as the local time of the requesting node 130. In embodiments in which the request mark 221 includes a specific color (field 421), the transmission time may be specified as the time since the requesting node 130 began transmitting packets marked with that specific color.

At step 712, the responding node 150 receives the marked request packet 220 from the requesting node 130, and records the receipt time (Trreq) of the marked request packet 220 at the responding node 150. The receipt time may be specified as the node-local time of the responding node 150. In embodiments in which the marks of the received request packets 220 include a specific color 423, the receipt time may be specified as the time since the receiving node 150 first received a packet marked with that specific color.

The method 710 loops from step 712 back to step 711 at step 713, so that the method 710 sends a plurality of marked request packets 220 from the requesting node 130 to the responding node 150. Consequently, the responding node 150 possesses a corresponding plurality of receipt times (i.e., one receipt time for each received request marked packet 220).

At step 714, the method quantifies jitter from a plurality of such receipt times.

Actual Jitter

In a preferred embodiment in which the clock of the requesting node 130 is synchronized with the clock of the responding node 150 (i.e., both nodes have identical node-local times), the transit time of each request packet 220 from the requesting node 130 to the responding node 150 may be determined by subtracting its transmit time (Ttreq) from its receipt time (Trreq). Actual one-way jitter may then be determined by comparing the respective transit times.

However, it should be remembered that in illustrative embodiments the respective node-local time kept by the requesting node 130 and the node-local time kept by the responding node 150 are not synchronized with one another, and consequently it is generally not possible to determine the actual transit time and/or "one way" jitter as described above. Consequently, some embodiments determine apparent transit time and apparent jitter as described below.

Apparent Jitter

A transit time between nodes that have un-synchronized node-local times or clocks is referred-to herein as an "apparent" transit time, as described below, and the apparent jitter as between two marked packets 220 received at the responding node 150 (which may be, but do not have to be, two consecutive marked request packets 220) may be determined by the difference (or "delta") between their apparent transit times.

The apparent transit time for a marked request packet 220 received at the responding node 150 is the difference between the receive time (at the responding node 150) and the transmit time (from the requesting node 130). For example, if a first received marked request packet 220 is sent from the requesting node 130 at time TreqnX1 (as specified according to the local time of the requesting node 130), and received at the responding node 150 at time TrespnY1, then the apparent transit time for the first received marked request packet 330 is Tapptrans1=TrespnY1−TreqnX1, or may alternatively the absolute value of that quantity: |TrespnY1−TreqnX1|. An apparent transit time Tapptrans2 for another marked request packet 220 may be quantified in the same way. Then, the apparent jitter between those two packets 220 may be defined as the difference between those apparent transit times: Tapptrans1−Tapptrans2, or the absolute value of that difference: |Tapptrans1−Tapptrans2|, to name but a few examples. In some embodiments, jitter may be defined as a single delta between to such packets, or may be defined as a mean or median of a plurality of deltas.

It should be noted that, in the embodiment of FIG. 7A, jitter is determined at the responding node 150. Consequently, at step 715, some embodiments report the jitter (in a jitter report), as determined, from the responding node 150 to the requesting node 130. Such a report may be sent by a response packet 260, or by a dedicated packet sent by responding node 150 to requesting node 130.

Round Trip Jitter

FIG. 7B is a flow chart of another embodiment of another method 720 of quantifying jitter.

At step 721, the method sends a plurality of marked packets 220 from the requesting node 130 to the responding node 150, and receive a plurality of response packets 260 from the responding node 150, as described above.

At step 722, the method quantifies the latency for each of the plurality of marked packets sent, using the process described above, to create a plurality of latency values.

Then, at step 723, the method quantifies jitter based on the plurality of latency values. Some embodiments quantify jitter as the value of (or, in some embodiments, the absolute value of) the difference between two consecutive latency values. For example, if latency for packet W is (Lw), and if latency for packet V is (Lv), then jitter for packet W and packet V is the difference between their respective latencies [i.e., Lw−Lv], or the absolute value of the difference between their respective latencies [i.e., |Lw−Lv|]. Other embodiments quantify jitter over more than two packets by averaging the latency of a plurality of packet pairs. For example, if latency of packet X is (Lx), then the jitter over packet W, packet V and packet X may be determined as on half of the sum of their respective latencies—i.e., jitter=|(Lw−Lv)+(Lv−Lx)|/2.

Other embodiments quantify jitter as the median of the plurality of latency values. Yet other embodiments quantify jitter as the mean of the plurality of latency values, and some quantify jitter as the mean and standard deviation of the plurality of latency values.

Packet Loss

FIG. 8 is a flow chart of an embodiment of a method 810 of quantifying packet loss. At step 811 of the method, the requesting node 130 sends a plurality of marked packets 220, each marked with a given color. The plurality of packets defines a block of color-marked packets. The number of color-marked packets in the block may be referred-to as Cblock.

At step 812, the requesting node 130 sends a signal to the responding node 150 to indicate that the requesting node has sent the last packet in the block of color-marked packets. For example, in some embodiments, the requesting node sends a packet 220 marked with a color different than the given color that defined the packets of the above-mentioned block of color-marked packets. The responding node 150 is configured to recognize that the change of color means that the requesting node 130 has sent the last packet in the block of color-marked packets.

In response, the responding node 150 marks a response packet 260 with data in mark 261 reporting the number of packets of the given color that the responding node 150 received (Crec), and sends that marked response packet 260 to the requesting node 130.

At step 813, the requesting node 130 receives the response packet 260 and extracts from its mark 261 the data reporting the number of packets of the given color that the responding node (Crec). The requesting node 150 then determines the packet loss rate, at step 814, for example by subtracting the number of packets of the given color that the responding node 150 received from the number of color-marked packets sent in the block of color-marked packets (i.e., Cblock−Crec), or by calculating a ratio of color-marked packets received to color-marked packets sent (Crec/Cbock), or by calculating a percentage of color-marked packets received (Crec/Cblock*100), or by calculating a percentage of color-marked packets dropped (100*Cblock-Crec/Cblock), to name but a few examples.

Stateful Routing

Figure 9:
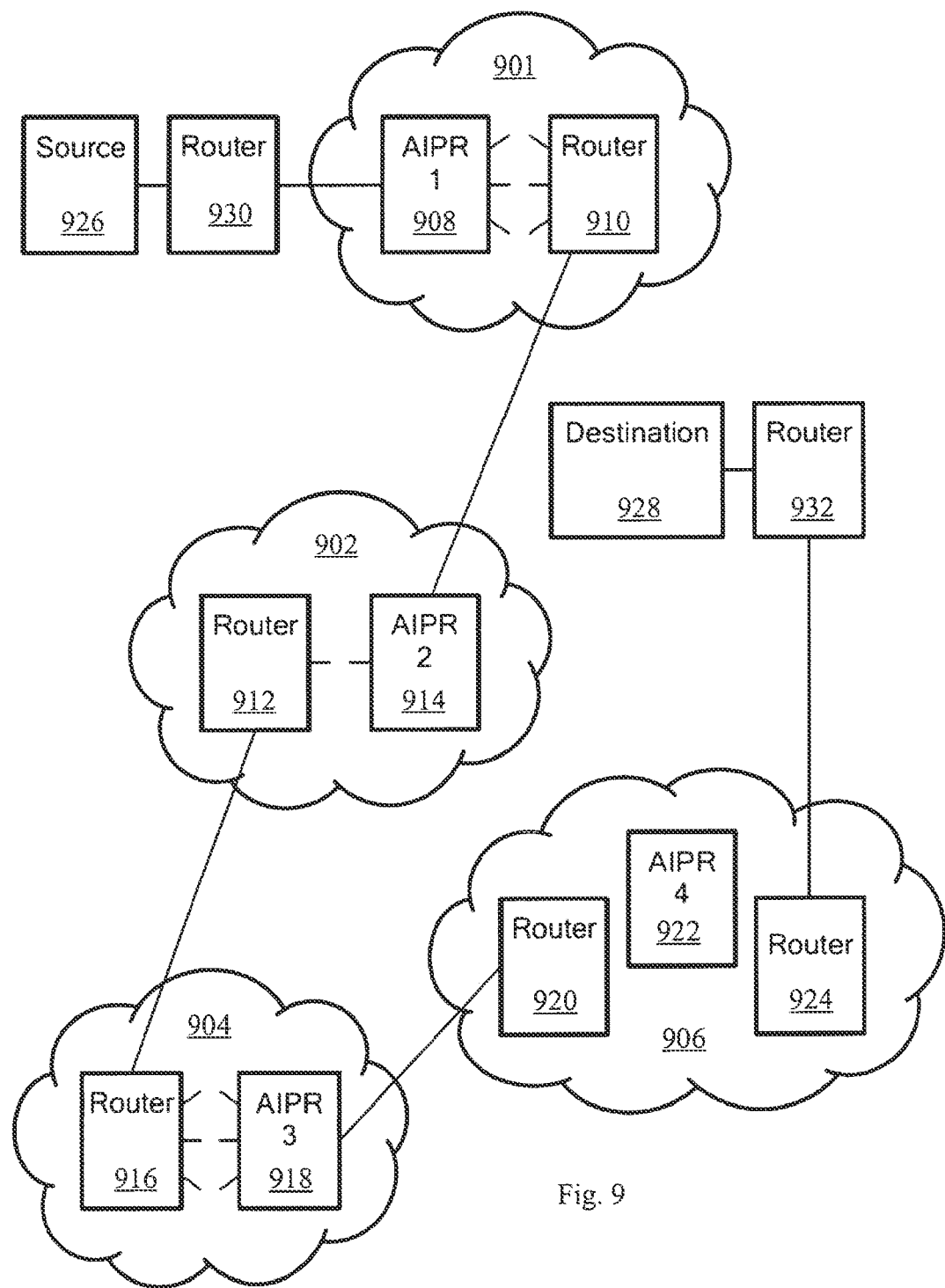
FIG. 9 schematically shows a hypothetical internet that includes routers and augmented IP routers (AIPRs), according some embodiments.

FIG. 9 schematically shows a hypothetical internet that includes routers and augmented IP routers (AIPRs), according to some embodiments.

In some embodiments, the packets of a session follow the same path as the lead packet of that session, at least in the forward direction, i.e., from a source node (e.g., 926) to a destination node (e.g., 928). The subsequent packets traverse at least a subset of the nodes (e.g., routers) the lead packet traverses between the source node 926 and the destination node 928. Among other benefits, this stateful routing scheme more effectively enhances the benefits of collecting routing metrics and statistics. Those skilled in the art may implement such a stateful routing scheme with the nodes and networks described herein. Stateful routing may be performed with marked packets as described above, and modification of packets in the implementation of stateful routing is compatible with, and may be performed on, such marked packets, including without limitation marked request packets 220 and marked response packets 260, whether traveling upstream or downstream.

Each router in the subset is referred to herein as an intermediate node or waypoint, although the waypoints are not necessarily predetermined before the lead packet is sent by the source node. The lead packet may be naturally routed, or routed by a pre-specified path. It should be noted that although the discussion below describes use of natural routing, it should not limit various embodiments to such a scheme. If the path is not pre-specified, then the path taken by the lead packet establishes the waypoints. In either case, the subsequent packets traverse the same waypoints, and in the same order, as the lead packet.

Of course, some packets may be dropped along the way, as is typical in an IP network or internet, such as by an overloaded router or due to corruption of the packet by a link. Thus, all the packets sent by the source node need not reach the session's destination node and, consequently, all the packets sent by the source node need not traverse all the waypoints. However, subsequent packets that do reach the destination node must traverse all the waypoints. For simplicity of explanation, dropped packets are ignored in the remaining discussion, and the term "all the packets" means all the packets that reach their respective destinations.

As a result of this forward flow control, metrics collected at one of the waypoints represent all the packets of the session. These metrics are not diluted by packets that bypass the waypoint, because no packet of the session can bypass any waypoint. Security functions, such as inspection for malicious packets, performed at one waypoint are sure to be performed on all packets of the session. Importantly, this enables statistics to be calculated for specific sessions.

Some embodiments also ensure that return packets from the destination node to the source node also follow the same path, i.e., traverse the waypoints, but in reverse order. This reverse flow control enables use of paths, such as via proprietary networks, which might not otherwise be available by naturally routing the return packets.

A packet flow controller (also referred to herein as an augmented IP router ("AIPR")) ensures that subsequent packets of a session follow the same path as the lead packet of the session, as discussed above. In fact, any of the nodes mentioned herein may be implemented as AIPRs/waypoints. An AIPR also performs conventional routing functions, and also those described above with regard to metrics and statistics collection. FIG. 9 is a schematic diagram illustrating a hypothetical set of interconnected networks 901, 902, 904 and 906, i.e., an internet. Each network 901-906 includes a number of routers and AIPRs, not all of which are necessarily shown. Network 901 includes AIPR1 908 and router 910. Network 901 may be, for example, a network of a telecommunications carrier. Network 902 includes a router 912 and AIPR 2 914. Network 902 may be, for example, a network of a first ISP. Network 904 includes a router 916 and AIPR 3 918. Network 904 may be, for example, the Internet backbone or a portion thereof. Network 906 includes a router 920, AIPR 4 922 and another router 924. Network 906 may be, for example, a network of a second ISP.

Assume a source node 926 initiates a session with a destination node 928. For example, the source node 926 may request a web page, and the destination node 928 may include a web server. The source node 926 may, for example, be part of a first local area network (LAN) (not shown) within a first corporation, and the LAN may be connected to the telecommunications carrier network 901 via a gateway router 930 operated by the corporation. Similarly, the destination node 928 may be operated by a second corporation, and it may be part of a second LAN (not shown) coupled to the network 906 of the second ISP via a gateway router 932 operated by the second corporation. As a lead packet of the session traverses the internet, each AIPR (waypoint) the packet traverses records information that eventually enables the waypoint to be able to identify its immediately previous waypoint and its immediately next waypoint, with respect to the session.

The lead packet of the session is naturally routed. Assume the lead packet reaches AIPR 1 908 before it reaches network 902, 904 or 906. AIPR 1 908 automatically identifies the lead packet as being an initial packet of the session. AIPR 1 908 may use various techniques to identify the beginning of a session, as noted above and as discussed in more detail below. AIPR 1 908 becomes the first waypoint along a path the lead packet eventually follows.

AIPR 1 908 assigns a unique identifier to the session and stores information about the session in the AIPR's database (e.g., memory 174) to enable the AIPR 1 908 to identify subsequent packets of the session. In some embodiments, AIPR 1 908 reads the client socket/service socket number pair in the lead packet and stores the client socket/service socket number pair in a database to uniquely identify the session. This enables the AIPR 1 908 to identify the subsequent packets as being part of the session, because all subsequent packets of the session will contain the same client socket/service socket number pair.

In some embodiments, AIPR 1 908 sets a flag in its database to indicate the lead packet has not traversed any other AIPR before reaching AIPR 1 908. This flag may be used later, for example when the AIPR 1 908 handles return packets. AIPR 1 908 may be able to identify the lead packet as not having traversed any other AIPR by lack of any modification to the packet. Such packet modification is described below.

AIPR 1 908 modifies the lead packet to indicate the lead packet has been handled by an AIPR. In some embodiments, the AIPR 1 908 stores the unique identifier of the session and, if not included in the unique identifier, the AIPR's network address in the packet to produce a modified lead packet. Subsequent AIPRs, if any, that handle the (now modified) lead packet use this modification to identify the lead packet as a lead packet that has been handled by an AIPR, and to indicate that subsequent packets of the session should be routed the same way as the lead packet is routed.

In some embodiments, AIPR 1 908 assigns a port number on the interface over which AIPR 1 908 will forward the lead packet. The AIPR's network address and this port number, in combination, may be used as a unique identifier of the session, at least from the point of view of the next AIPR along the path. AIPR 1 908 may include the AIPR's network address-port number combination in the modified lead packet. Thus, the next AIPR along the path may assume that subsequent packets sent from this network address-port number combination are part of, or likely to be part of, the session.

AIPR 1 908 then forwards the lead packet naturally. The lead packet traverses an unspecified number of nodes of network 901 until it reaches router 910, which naturally routes the lead packet to network 902. Assume the router 910 forwards the lead packet to AIPR 2 914 in network 902.

AIPR 2 914 detects the modification to the lead packet, identifying a need for special treatment. AIPR 2 914 becomes the second waypoint along the path the lead packet will follow. AIPR 2 914 stores in its database the network address of AIPR 1 908 and the port number assigned by AIPR 1 908, in association with a unique identifier of the session, such as the client and server socket number pair, thus identifying the previous waypoint along the path in association with the session. In this way, each waypoint learns the network address and port number of the previous waypoint along this session's path and uses a related association device (an "associator") to associate this information with a session identifier. This information may be used later to forward return packets, from waypoint to waypoint, back to the source node 926.

In some embodiments, AIPR 2 914 assigns a port number on the interface over which the lead packet was received. The AIPR's network address and this port number, in combination, may be used as a unique identifier of the session, at least from the point of view of AIPR 1 908. Thus, subsequent packets addressed to this network address-port number combination may be assumed to be, or at least are likely to be, part of the session.

In some embodiments, AIPR 2 914 sends a packet back to AIPR 1 908 to inform AIPR 1 908 of the network address-port number combination, in association with the identification of the session. In some embodiments, the network address-port number combination are sent to AIPR 1 908 later, in connection with a return packet, as described below. In either case, AIPR 1 908 learns a network address-port number combination unique to the session, and AIPR 1 908 sends subsequent packets to that address-port combination, rather than naturally forwarding the subsequent packets. In this way, each waypoint learns the network address and port number of the next waypoint along this session's path. This information is used to forward subsequent packets, from waypoint to waypoint, forward to the destination node 928, along the same path as the lead packet.

AIPR 2 914 modifies the lead packet to include the network address of AIPR 2 914, and then forwards the lead packet naturally. As with AIPR 1 908, in some embodiments AIPR 2 914 assigns a port number on the interface over which AIPR 2 914 forwards the packet, and the network address of AIPR 2 914 and the port number are included in the modified lead packet AIPR 2 914 sends.

The lead packet traverses an unspecified number of nodes of network 902, until it reaches router 912, which naturally routes the lead packet to network 904. Assume the router 916 forwards the lead packet to AIPR 3 918.

AIPR 3 918 becomes the third waypoint along the path the lead packet will follow. AIPR 3 918 operates much as AIPR 2 914. The lead packet is then forwarded to network 906, where it traverses AIPR 4 922, which becomes the fourth waypoint.

Three scenarios are possible with respect to the last AIPR 922 (AIPR 4) along the path to the destination node 928.

In the first scenario, one or more AIPRs relatively close to a destination node are provisioned to handle lead packets for the destination node. The AIPRs may be so provisioned by storing information in their databases to identify the destination node, such as by the service socket number or other unique identifier of the service. These "terminus" AIPRs broadcast their ability to forward packets to the destination node. A terminus AIPR is an AIPR that can forward packets to a destination node, without the packets traversing another AIPR. A terminus AIPR recognizes a lead packet destined to a service that terminates at the AIPR by comparing the destination node socket number to the information provisioned in the AIPR's database.

If AIPR 4 922 has been so provisioned, AIPR 4 922 may restore the lead packet to its original form, i.e., the form the lead packet had when the source node 926 sent the lead packet, or as the packet might have been modified by the router 930, such as a result of network address translation (NAT) performed by the router 930. Thus, the lead packet may be restored to a form that does not include any of the modifications made by the waypoints 908, 914 and 918. AIPR 4 922 then forwards the lead packet to the destination node 928. Like AIPR 3 918, AIPR 4 922 stores information in its database identifying AIPR 3 918 as the previous AIPR for this session.

In the second scenario, AIPR 4 922 is not provisioned with information about the destination node 928. In such embodiments, AIPR 4 922 may operate much as AIPR 2 914 and AIPR 3 918 operate. AIPR 4 922 modifies and naturally forwards the lead packet, and the lead packet is eventually delivered to the destination node 928. The destination node 928 responds to the lead packet. For example, if the lead packet is a SYN packet to initiate a TCP session, the destination node 928 responds with an ACK or SYN/ACK packet. AIPR 4 922 recognizes the return packet as being part of the session, such as based on the source node/destination node network address/port number pairs in the return packet. Furthermore, because the return packet was sent by the destination node 928, and not another AIPR, AIPR 4 922 recognizes that it is the last AIPR along the path for this service.

AIPR 4 922 stores information in its database indicating AIPR 4 922 is a terminus AIPR. If AIPR 4 922 receives subsequent packets of the session, AIPR 4 922 may restore the subsequent packets to their original forms, i.e., the forms the subsequent packets had when the source node 926 sent the subsequent packets, or as the packets might have been modified by the router 930, such as a result of network address translation (NAT) performed by the router 930. AIPR 4 922 forwards the subsequent packets to the destination node 928.

AIPR 4 922 modifies the return packet to include a port number on the interface AIPR 4 922 received the lead packet from AIPR 3 918, as well as the network address of AIPR 4 922. AIPR 4 922, then forwards the return packet to AIPR 3 918. Although the return packet may be forwarded by other routers, AIPR 4 922 specifically addresses the return packet to AIPR 3 918. This begins the return packet's journey back along the path the lead packet traveled, through all the waypoints traversed by the lead packet, in reverse order. Thus, the return packet is not naturally routed back to the source node 926.

AIPR 3 918 receives the modified return packet and, because the return packet was addressed to the port number AIPR 3 918 previously assigned and associated with this session, AIPR 3 918 can assume the return packet is part of, or likely part of, the session. AIPR 3 918 copies the network address and port number of AIPR 4 922 from the return packet into the AIPR's database as the next waypoint for this session. If AIPR 3 918 receives subsequent packets of the session, AIPR 3 918 forwards them to the network address and port number of the next waypoint, i.e., AIPR 4 922.

Thus, once an AIPR is notified of a network address and port number of a next AIPR along a session path, the AIPR forwards subsequent packets to the next AIPR, rather than naturally routing the subsequent packets.

AIPR 3 918 forwards the return packet to AIPR 2 914, whose network address and port number were stored in the database of AIPR 3 918 and identified as the previous waypoint of the session. Likewise, each of the waypoints along the path back to the source node 926 forwards the return packet to its respective previous waypoint.

When the first waypoint, i.e., AIPR 1 908, receives the return packet, the waypoint may restore the return packet to its original form, i.e., the form the return packet had when the destination node 928 sent the return packet, or as the packet might have been modified by the router 930, such as a result of network address translation (NAT) performed by the router 930. Recall that the first waypoint set a flag in its database to indicate the lead packet had not traversed any other waypoint before reaching the first waypoint. This flag is used to signal the first waypoint to restore the return packet and forward the restored return packet to the source node 926. The first waypoint forwards the return packet to the source node 926. Subsequent return packets are similarly handled.

In the third scenario, not shown in FIG. 9, the last AIPR to receive the lead packet has a network address equal to the network address of the destination node. For example, the destination node network address may be given to a gateway router/AIPR, and the gateway router/AIPR may either process the service request or its router table may cause the packet to be forwarded to another node to perform the service. The last AIPR may restore the lead packet and subsequent packets, as described above.

It should be noted that although preferred embodiments use stateful routing as noted above, other embodiments do not use stateful routing.

A listing of some reference numbers used in this specification is presented below.
- 100: Network;
- 111: Node;
- 112: Node;
- 115: Node set 1;
- 121: Node;
- 122: Node;
- 125: Node set 2;
- 130: Requesting node;
- 140: Intermediate node or plurality of nodes;
- 150: Responding node;
- 170: Node;
- 171: Bus;
- 172: Network Interface;
- 173: Computer processor;
- 174: Memory;
- 175: Packet capture module;
- 176: Packet marking module;
- 177: Packet de-marking module;
- 178: Analytics module;
- 179: Time keeper;
- 200: First selected packet;
- 201: First selected packet header;
- 202: First selected packet payload;
- 220: Marked request packet;
- 221: Request mark;
- 250: Second selected packet;
- 251: Second selected packet header;
- 252: Second selected packet payload;
- 260: Marked response packet;
- 261: Response mark;
- 420: Mark value;
- 421: Transmit color;
- 422: Transmit time stamp;
- 423: Received color;
- 424: Adjusted timestamp;
- 425: Drop bit;
- 426: Previous color received count;
- 427: Previous received color;
- 428: Current transmit color;
- 901; 902; 904; 906: Networks;
- 908; AIPR 1
- 910; 912; 916; 920; 924; 932: Routers;
- 914: AIPR 2;
- 918: AIPR 3;
- 922: AIPR 4;
- 926: Source router;
- 928: Destination router.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A method of providing network performance data for monitoring network performance in the transmission of data over a network, the network including a source node in communication with a destination node via a requesting node and a responding node, the method including: receiving, at the responding node from the requesting node (via a set of intermediate nodes), a marked downstream packet, the marked downstream packet conforming to a first communication protocol (a node will process the marked downstream packet according to the communication protocol), the marked downstream packet comprising a header; a payload field, and signature data; extracting, from the marked downstream packet, the signature data; capturing, at the responding node, an upstream packet, the upstream packet conforming to a second communication protocol; marking, the upstream packet, by adding response data to create an upstream marked packet, the response data comprising, and the upstream marked packet conforming to a second communication protocol; and transmitting the upstream marked packet to the requesting node according to the second protocol.

P11. A method of monitoring packet loss rate over a network of nodes, the network including an requesting node sending a plurality of color-marked packets to a responding node, the method comprising: receiving, at the responding node from the requesting node, a subset of the color-marked sent by the requesting node; counting the subset of the first plurality of packets received at the responding node, to produce a success count; capturing, at the responding node, an upstream packet, the upstream packet conforming to a second communication protocol; marking, the upstream packet, by adding to the upstream packet data comprising the success count, to create an upstream marked packet, the upstream marked packet conforming to a second communication protocol; and transmitting the upstream marked packet to the requesting node according to the second protocol.

P21. A method of monitoring network performance of transmission of data over a network of nodes, the network including at least a requesting node and a responding node, the method comprising: capturing, at the requesting node, a first packet traveling downstream from a previous node, the first packet conforming to a first communication protocol; marking the first packet by adding a request mark to create a first downstream marked packet, the request mark including signature data; transmitting the first downstream marked packet to the responding node according to normal operation of the network; receiving, at the requesting node, an upstream marked packet sent by the responding node in response to the first downstream marked packet, the upstream marked packet conforming to a second communication protocol and having a response mark having response data; extracting the response data from the upstream marked packet; removing the response mark from the upstream marked packet; and determining, from the response data, a performance metric for communication between the requesting node and the responding node.

P22. The method of P21, wherein: the network includes an intermediate node between the requesting node and the responding node, and wherein: the performance metric is round-trip latency between the requesting node and the responding node via the intermediate node, and wherein the response data includes: a modified time of transmission of the first downstream marked packet from the requesting node, the modified time of transmission comprising the sum of (i) the time of transmission of the first downstream marked packet from the requesting node and (ii) turnaround time, the turnaround time being the time between receipt of the first downstream marked packet at the responding node and the transmission of the upstream marked packet from the responding node).

P23. The method of P22, wherein the performance metric is round-trip latency between the requesting node and the responding node, and determining the round-trip latency, at the requesting node, comprises: recording a time of receipt of the upstream marked packet at the requesting node; and subtracting, from the time of receipt of the upstream marked packet at the requesting node, the modified time of transmission of the first downstream marked packet from the requesting node.

P24. The method of P21, wherein the performance metric is jitter, and determining jitter comprises: capturing, at the requesting node, a second packet traveling downstream; marking the second packet by adding a second request mark to create a second downstream marked packet, the second request mark including a time of transmission of the second downstream marked packet from the requesting node to the responding node; and transmitting the second downstream marked packet to the responding node according to normal operation of the network; wherein the response mark of the upstream marked packet sent by the responding node includes a jitter data comprising a difference between apparent transit times, respectively, of the first downstream marked packet and the second downstream marked packet from the requesting node to the responding node.

P25 The method of P21, wherein capturing, at the requesting node, a first packet comprises: capturing a candidate packet arriving at the requesting node, and confirming that the candidate packet is configured in a protocol that can be safely modified.

P26. The method of P21, wherein capturing, at the requesting node, a first packet comprises: capturing a candidate packet arriving at the requesting node, and confirming that the candidate packet is of a size that is below a threshold size.

P27. The method of P21, wherein capturing, at the requesting node, a first packet, comprises: capturing a set of candidate packets; checking each of the candidate packets for compliance with a pre-defined criterion; and selecting, as the first packet, a one of the candidate packets that meets the pre-defined criterion.

P28. The method of P21, wherein the performance metric is packet loss, and wherein: the signature data of the first downstream packet includes a color; and the method further comprises: sending a set of additional downstream marked request packets from the requesting node to the responding node, each of the additional downstream marked request packets marked with the same color; and the response data from the upstream marked packet includes data reporting the number packets of the color received at the responding node.

P29. The method of P21, further comprising taking network action in response to one or more determined performance metrics, wherein taking network action comprises one of (a) changing the priority level of future packets traveling to the requesting node, or (b) specifying a modified route of future packets, such that the future packets avoid the requesting node.

P30: A method of detecting packet loss rate over a network of nodes, the network including a requesting node and a responding node, the method comprising: capturing, at the requesting node, a plurality of packets traveling downstream, each packet of the plurality of packets conforming to a communication protocol; creating a plurality of downstream marked packets by, for each captured packet: marking the packet by adding a color mark to create a downstream marked packet, the color mark including color data associating the downstream marked packet with a color; transmitting the downstream marked packets to the responding node according to normal operation of the network; tracking the number of downstream marked packets of each color transmitted to the downstream mode; receiving, at the requesting node, an upstream marked packet sent by the responding node, the upstream marked packet having mark carrying response data reporting the number of packets of each color received at the responding node; extracting the response data from the upstream marked packet; removing the mark from the upstream marked packet; and determining, the number of packets of a given color lost between the requesting node and the responding node by subtracting the data reporting the number of packets of the given color received at the responding node from the number of downstream marked packets of each color transmitted by the requesting node to the responding node.

P31. The method of P30, wherein capturing, at the requesting node, a plurality of packets traveling downstream, comprises for each packet: capturing a candidate packet arriving at the requesting node, and confirming that the candidate packet is configured in a protocol that can be safely modified.

P32. The method of P30, wherein capturing, at the requesting node, a plurality of packets traveling downstream, comprises for each packet: capturing a candidate packet arriving at the requesting node, and confirming that the candidate packet is of a size that is below a threshold size.

P33. The method of P30, further comprising taking network action in response to determining the number of packets of a given color lost between the requesting node and the responding node.

P34. The method of P33, wherein taking network action comprises specifying a modified route of future packets, such that the future packets avoid the requesting node.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include computer-readable program code, including a series of computer instructions fixed either on a tangible medium, such as a tangible, non-transient computer readable medium (e.g., a diskette, CD-ROM, ROM, FLASH memory, or fixed disk). The series of computer instructions can embody all or part of the functionality previously described herein with respect to the system. Such computer instructions, when executed on a computer processor, cause the computer processor to perform computer processes implementing all or part of the functionality previously described herein.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A first network device configured to:
   forward a first packet received for a session between a first client device and a second client device along a first network path, wherein the first network path includes a second network device, and wherein the first packet comprises a first header, first metadata specifying a first mark, and a first payload, wherein the first packet is modified to insert the first metadata specifying the first mark between the first header and the first payload without modifying the first header;
   determine a metric for the first network path based at least in part on the first mark and a second mark, wherein a second packet of the session that is received, in response to forwarding the first packet including the first mark, from the second network device comprises a second header, second metadata specifying the second mark, and a second payload, wherein the second metadata specifying the second mark is inserted between the second header and the second payload without modifying the second header; and
   forward, based on the metric for the first network path, subsequent packets for the session along a second network path, wherein the second network path does not include the second network device.

2. The first network device of claim 1,
   wherein the first mark comprises a color for the session, and
   wherein the second mark comprises a number of packets of the color.

3. The first network device of claim 2,
   wherein to forward the first packet, the first network device is configured to forward a first number of packets of the session that includes the color, and wherein to determine the metric for the first network path, the first network device is configured to determine a packet loss of the first network path based on the first number of packets of the session that include the color forwarded by the first network device and a second number of packets of the color received by the second network device.

4. The first network device of claim 1,
wherein the first mark comprises a first time,
wherein the second mark comprises a second time.

5. The first network device of claim 4,
wherein the first time comprises a time at which the first metadata was inserted within the first packet,
wherein the second time comprises a time at which the second network device received the first packet from the first network device, and
wherein to determine the metric for the first network path, the first network device is configured to determine the metric for the first network path based on the first time and the second time.

6. The first network device of claim 1, wherein the first mark comprises one or more of:
a transmit color;
a transmit time;
a received color;
a received time; and
a previous color received count.

7. The first network device of claim 1, wherein the first mark comprises one or more of:
a first color of the first packet;
a time at which the first metadata was inserted within the first packet;
a second color of a third packet most recently received from the second network device;
a cached time adjusted by an elapsed time between caching of the third packet and the time at which the first metadata was inserted within the first packet; and
a number of one or more packets of the second color received from the second network device.

8. The first network device of claim 1, wherein the first metadata comprises a Type-Length-Value (TLV) field specifying the first mark.

9. The first network device of claim 1, wherein the second metadata of the second packet includes a drop field indicating that the second packet should be dropped.

10. The first network device of claim 1,
wherein the session comprises a forward packet flow originating from the first client device and destined for the second client device and a reverse packet flow originating from the second client device and destined for the first client device,
wherein the first packet comprises one or more packets of the forward packet flow, and
wherein the second packet comprises one or more packets of the reverse packet flow.

11. A method comprising:
forwarding, by a first network device, a first packet received for a session between a first client device and a second client device along a first network path, wherein the first network path includes a second network device, and wherein the first packet comprises a first header, first metadata specifying a first mark, and a first payload, wherein the first packet is modified to insert the first metadata specifying the first mark between the first header and the first payload without modifying the first header;

determining, by the first network device, a metric for the first network path based at least in part on the first mark and a second mark, wherein a second packet of the session that is received, in response to forwarding the first packet including the first mark, from the second network device comprises a second header, second metadata specifying the second mark, and a second payload, wherein the second metadata specifying the second mark is inserted between the second header and the second payload without modifying the second header; and
forwarding, by the first network device and based on the metric for the first network path, subsequent packets for the session along a second network path, wherein the second network path does not include the second network device.

12. The method of claim 11,
wherein the first mark comprises a color for the session, and
wherein the second mark comprises a number of packets of the color.

13. The method of claim 12,
wherein forwarding the first packet comprises forwarding a first number of packets of the session that includes the color, and
wherein determining the metric for the first network path comprises determining a packet loss of the first network path based on the first number of packets of the session that include the color forwarded by the first network device and a second number of packets of the color received by the second network device.

14. The method of claim 11,
wherein the first mark comprises a first time,
wherein the second mark comprises a second time.

15. The method of claim 14,
wherein the first time comprises a time at which the first metadata was inserted within the first packet,
wherein the second time comprises a time at which the second network device received the first packet from the first network device, and
wherein determining the metric for the first network path comprises determining the metric for the first network path based on the first time and the second time.

16. The method of claim 11, wherein the first mark comprises one or more of:
a transmit color;
a transmit time;
a received color;
a received time; and
a previous color received count.

17. The method of claim 11, wherein the first mark comprises one or more of:
a first color of the first packet;
a time at which the first mark metadata was inserted within the first packet;
a second color of a third packet most recently received from the second network device;
a cached time adjusted by an elapsed time between caching of the third packet and the time at which the first metadata was inserted within the first packet; and
a number of one or more packets of the second color received from the second network device.

18. The method of claim 11, wherein the first metadata comprises a Type-Length-Value (TLV) field specifying the first mark.

19. The method of claim 11, wherein the second metadata of the second packet includes a drop field indicating that the second packet should be dropped.

20. A non-transitory, computer-readable medium comprising instructions that, when executed, are configured to cause processing circuitry of a first network device to:
- forward a first packet received for a session between a first client device and a second client device along a first network path, wherein the first network path includes a second network device, and wherein the first packet comprises a first header, first metadata specifying a first mark, and a first payload, wherein the first packet is modified to insert the first metadata specifying the first mark between the first header and the first payload without modifying the first header;
- determine a metric for the first network path based at least in part on the first mark and a second mark, wherein a second packet of the session that is received, in response to forwarding the first packet including the first mark, from the second network device comprises a second header, second metadata specifying the second mark, and a second payload, wherein the second metadata specifying the second mark is inserted between the second header and the second payload without modifying the second header; and
- forward, based on the metric for the first network path, subsequent packets for the session along a second network path, wherein the second network path does not include the second network device.

\* \* \* \* \*